(12) United States Patent
Itoh et al.

(10) Patent No.: US 9,889,406 B2
(45) Date of Patent: Feb. 13, 2018

(54) EXHAUST GAS PURIFICATION APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Kazuhiro Itoh, Mishima (JP);
Hiromasa Nishioka, Susono (JP);
Yoshihisa Tsukamoto, Susono (JP);
Hiroshi Ohtsuki, Gotenba (JP);
Yasumasa Notake, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 126 days.

(21) Appl. No.: 15/098,454

(22) Filed: Apr. 14, 2016

(65) Prior Publication Data
US 2016/0303509 A1 Oct. 20, 2016

(30) Foreign Application Priority Data

Apr. 15, 2015 (JP) .................................. 2015-083778
Nov. 10, 2015 (JP) .................................. 2015-220750

(51) Int. Cl.
*B01D 50/00* (2006.01)
*B01D 53/94* (2006.01)
(Continued)

(52) U.S. Cl.
CPC ..... *B01D 53/9418* (2013.01); *B01D 53/9431* (2013.01); *B01D 53/9495* (2013.01);
(Continued)

(58) Field of Classification Search
CPC ............ B01D 53/9428; B01D 53/9418; B01D 2255/50; B01J 29/7615; B01J 29/7215; B01J 37/0246
(Continued)

(56) References Cited

U.S. PATENT DOCUMENTS

2008/0286184 A1 11/2008 Ando et al.
2010/0077738 A1 4/2010 Cavataio et al.
(Continued)

FOREIGN PATENT DOCUMENTS

JP 2008-279334 11/2008

*Primary Examiner* — Tom P Duong
(74) *Attorney, Agent, or Firm* — Finnegan, Henderson, Farabow, Garrett & Dunner, LLP

(57) ABSTRACT

An apparatus may have a selective catalytic reduction NOx catalyst including a high-temperature catalyst layer having high capability of reducing NOx at high temperatures and a low-temperature catalyst layer having higher capability of reducing NOx at low temperatures than that of the high-temperature catalyst layer. The low-temperature catalyst layer may be arranged closer to a catalyst substrate than the high-temperature catalyst layer. A supply valve may add an addition quantity of reducing agent for reducing NOx to exhaust gas flowing into the selective catalytic reduction NOx catalyst. A controller may comprise at least one processor configured to control addition of the reducing agent by the supply valve such that the reducing agent concentration in a reducing agent atmosphere formed in the exhaust gas flowing into the selective catalytic reduction NOx catalyst is higher when the temperature of the selective catalytic reduction NOx catalyst is in a specific low temperature range.

6 Claims, 18 Drawing Sheets

(51) Int. Cl.
   *B01J 37/02* (2006.01)
   *F01N 3/20* (2006.01)
   *F01N 11/00* (2006.01)
   *B01J 23/00* (2006.01)
   *B01J 23/34* (2006.01)
   *B01J 29/072* (2006.01)

(52) U.S. Cl.
   CPC ............ *B01J 23/002* (2013.01); *B01J 23/34* (2013.01); *B01J 29/072* (2013.01); *B01J 37/0244* (2013.01); *B01J 37/0246* (2013.01); *F01N 3/208* (2013.01); *F01N 11/002* (2013.01); *B01D 2251/2062* (2013.01); *B01D 2251/2067* (2013.01); *B01D 2255/9022* (2013.01); *B01D 2257/404* (2013.01); *B01J 2229/186* (2013.01); *F01N 2370/02* (2013.01); *F01N 2550/02* (2013.01); *F01N 2610/02* (2013.01); *F01N 2610/146* (2013.01); *F01N 2610/1453* (2013.01); *F01N 2900/1402* (2013.01); *F01N 2900/1404* (2013.01); *F01N 2900/1602* (2013.01); *Y02T 10/24* (2013.01)

(58) Field of Classification Search
   USPC .......................... 422/171, 177, 180; 60/301
   See application file for complete search history.

(56) References Cited

U.S. PATENT DOCUMENTS

| | | | |
|---|---|---|---|
| 2010/0196221 A1 | 8/2010 | Ando et al. | |
| 2011/0116982 A1* | 5/2011 | Kunieda | B01J 29/7215 422/177 |
| 2011/0305613 A1* | 12/2011 | Stiebels | B01D 53/9418 423/213.5 |
| 2012/0107204 A1* | 5/2012 | Cox | B01D 53/9468 423/213.5 |
| 2012/0204547 A1* | 8/2012 | Ishimaru | B01D 53/9468 60/301 |
| 2013/0089483 A1* | 4/2013 | Stiebels | B01J 29/04 423/239.2 |

* cited by examiner

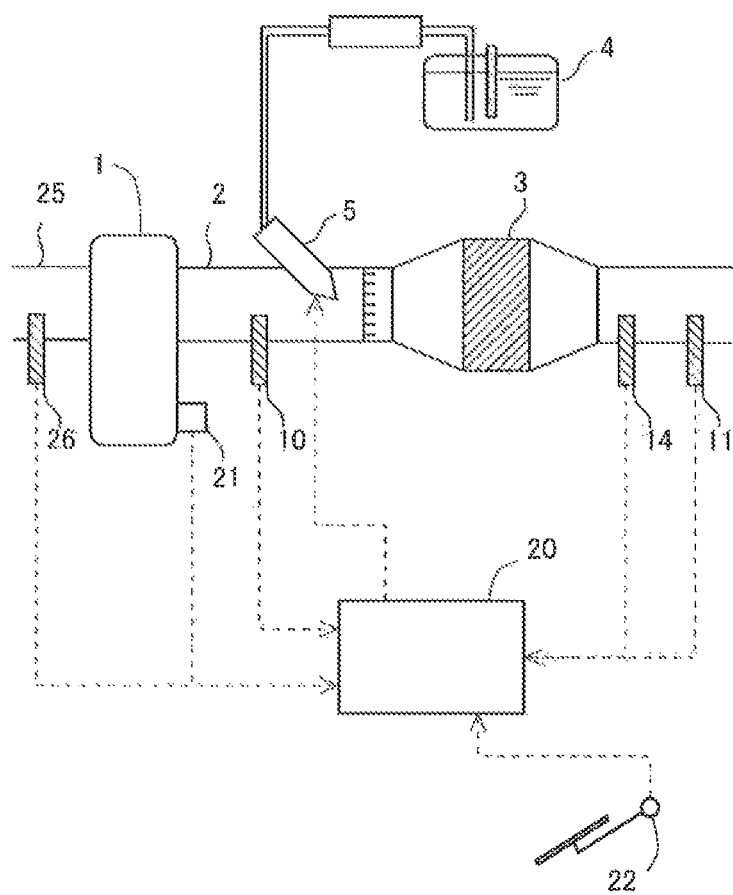
[Fig. 1A]

[Fig. 1B]
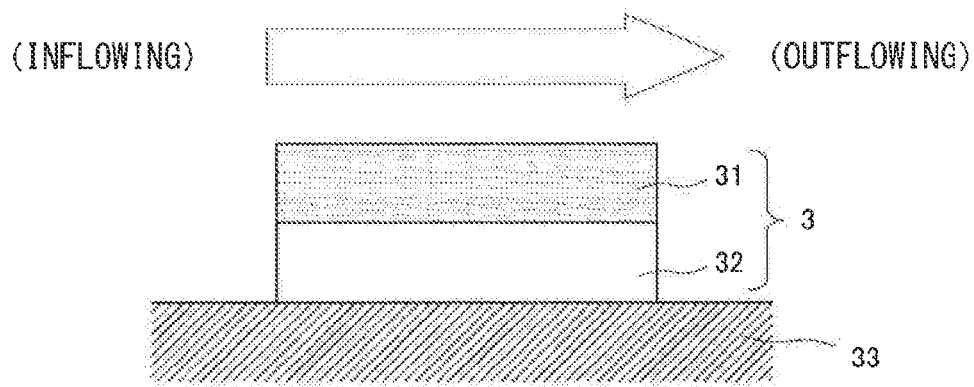
[Fig. 2]
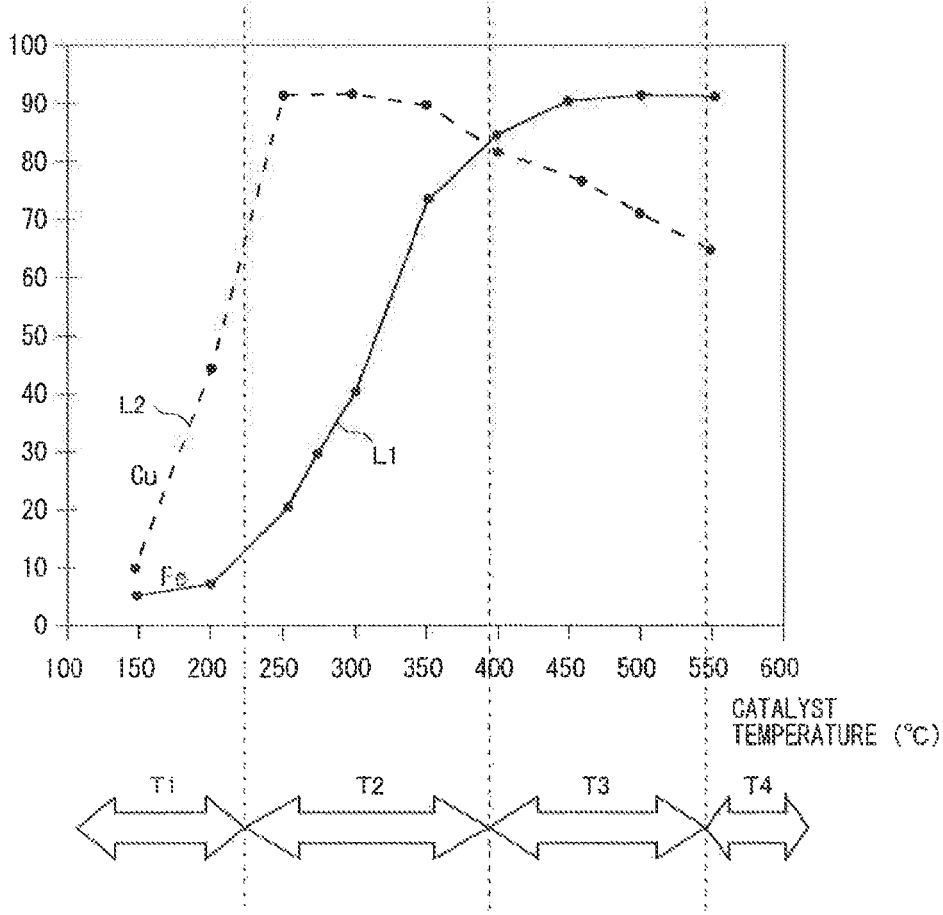

[Fig. 3A]
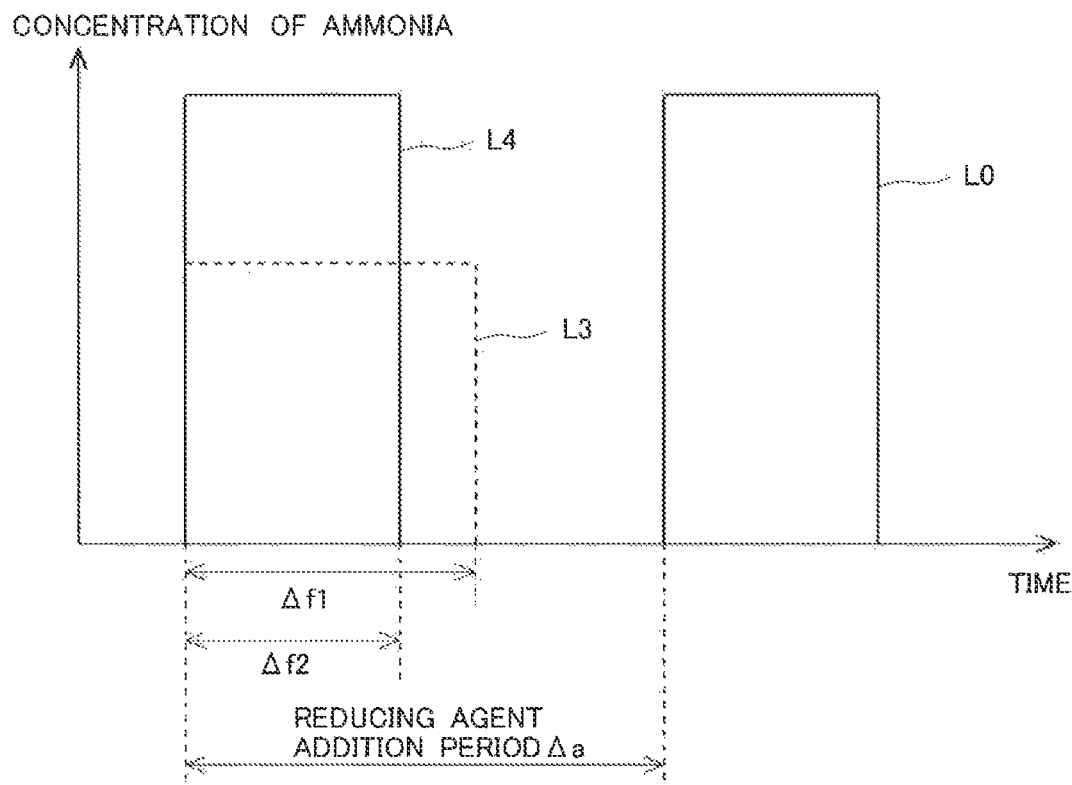
[Fig. 3B]
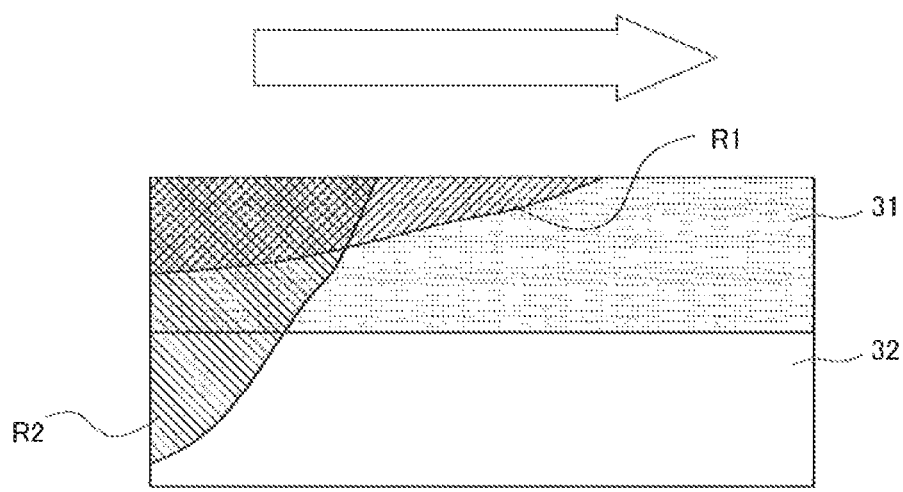

[Fig. 4]
(a) SUPPLY VALVE OPEN TIME
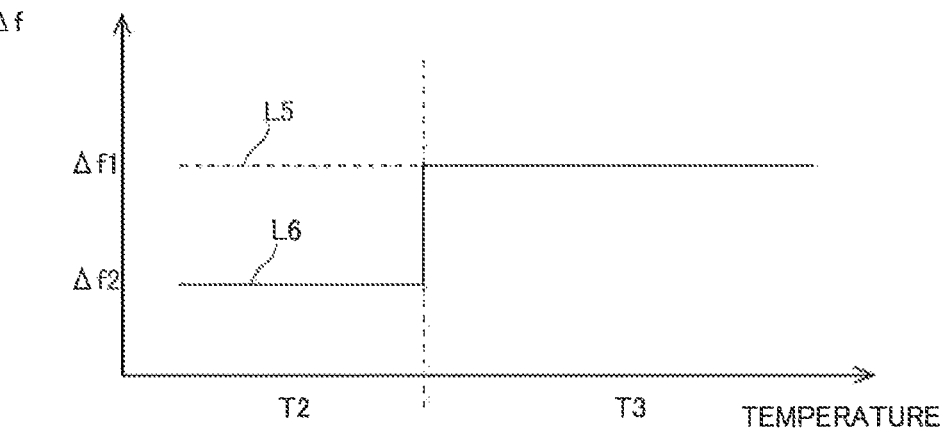
(b) CONCENTRATION OF AMMONIA
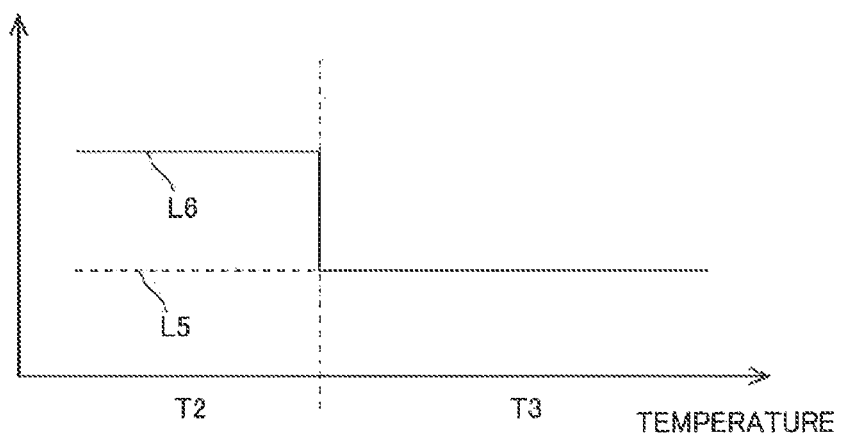
(c) SUPPLY RATE
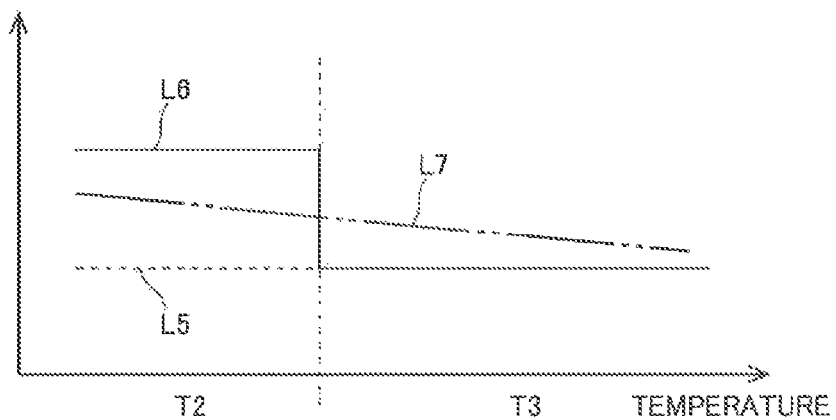

[Fig. 5]
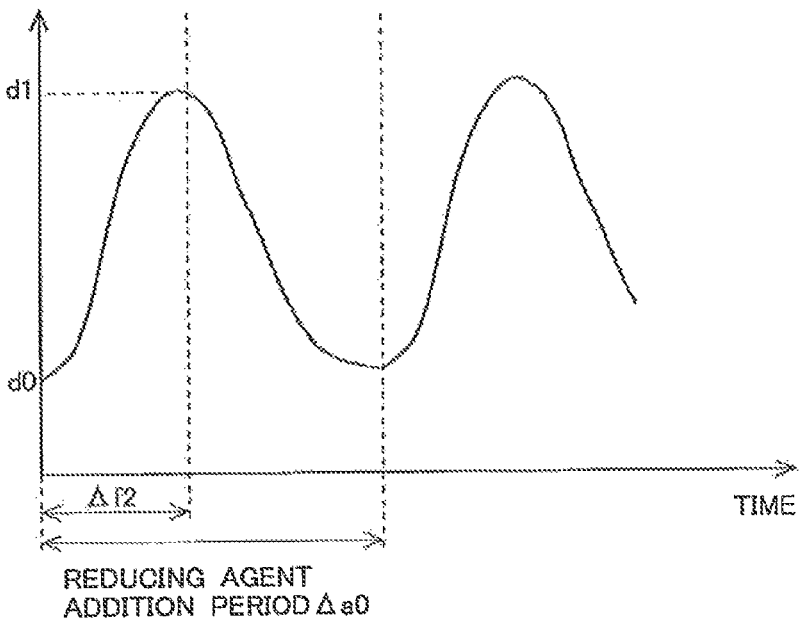
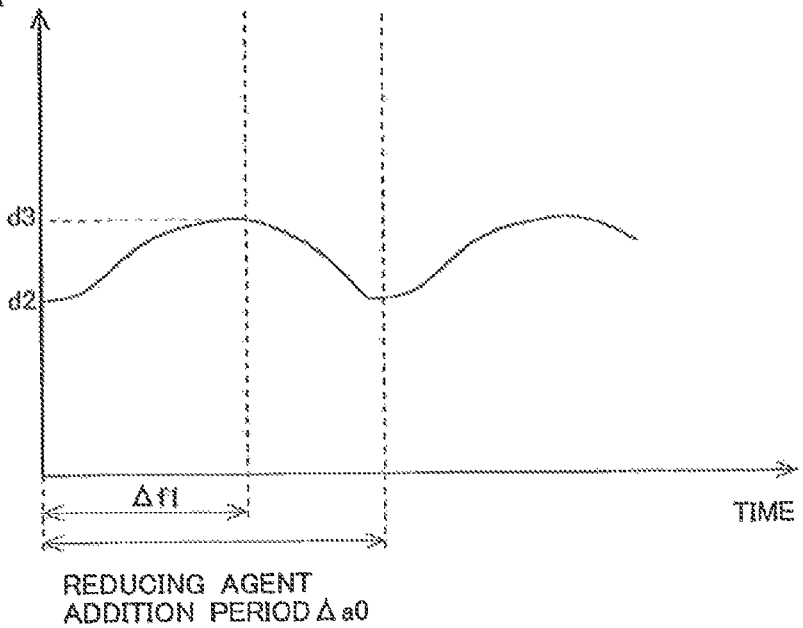

[Fig. 6]
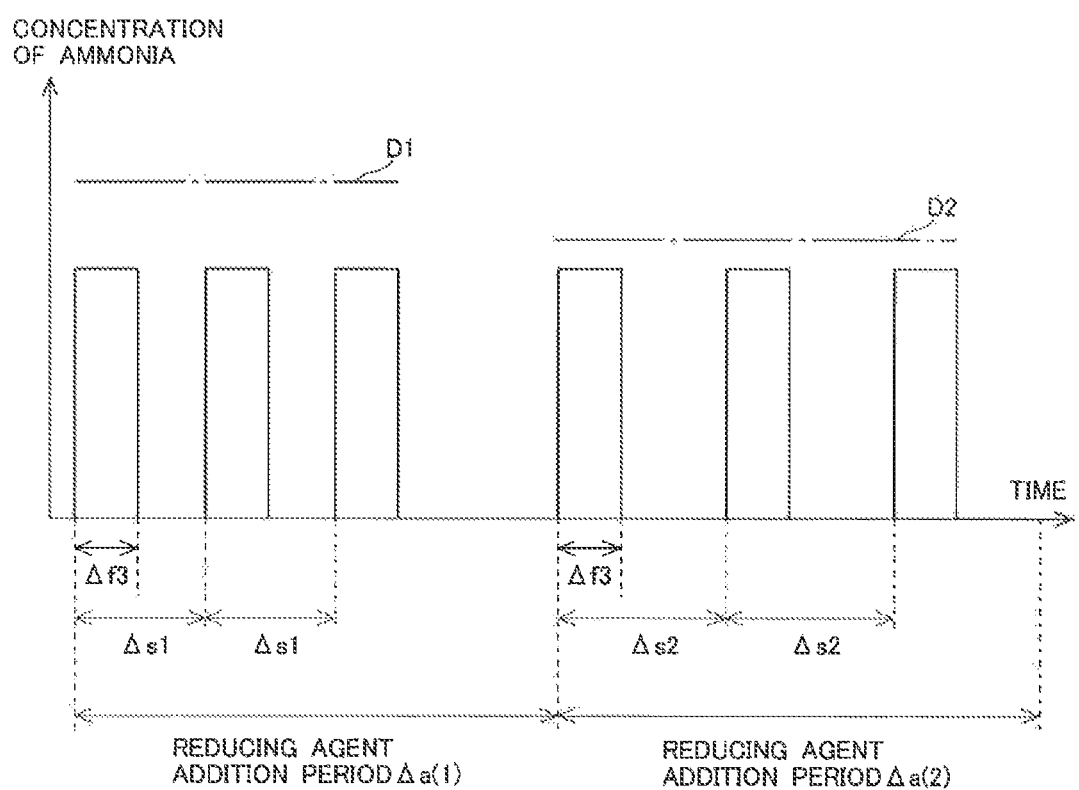

[Fig. 7]
(a) SPIKE INTERVAL
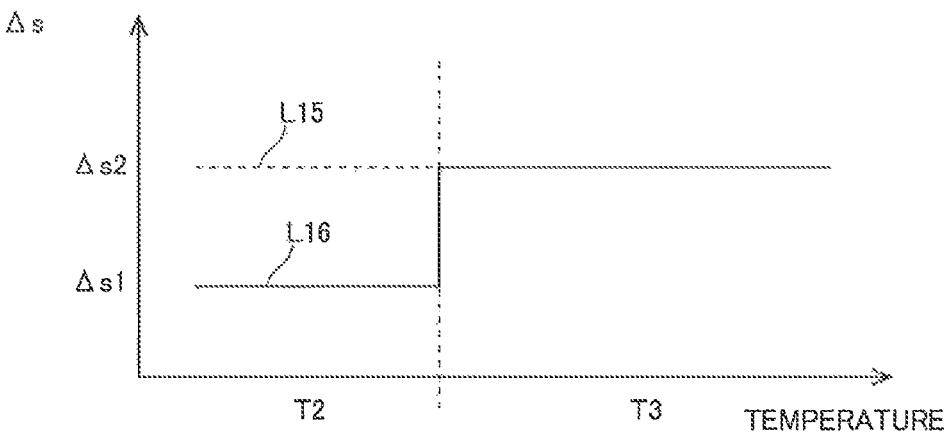
(b) CONCENTRATION OF AMMONIA
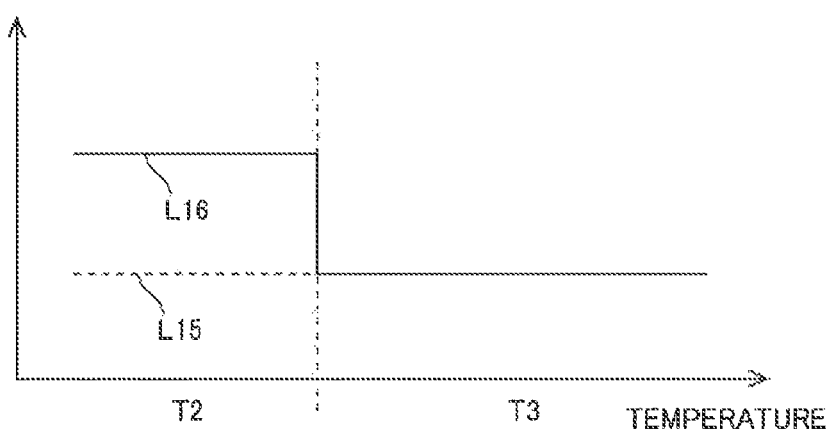
(c) SUPPLY RATE
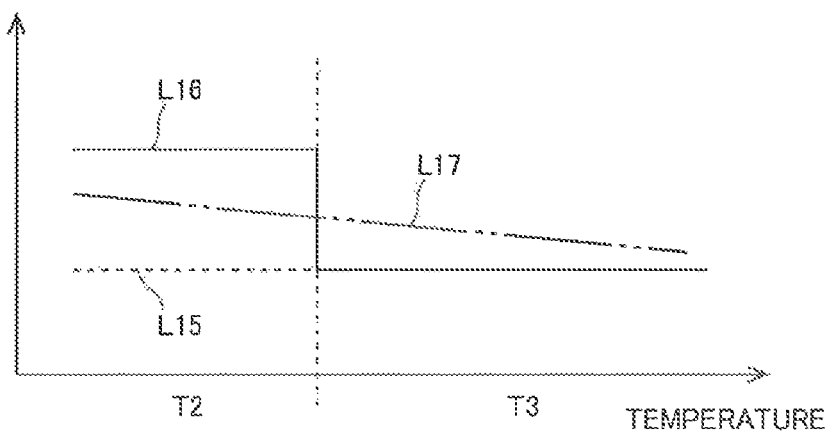

[Fig. 8]
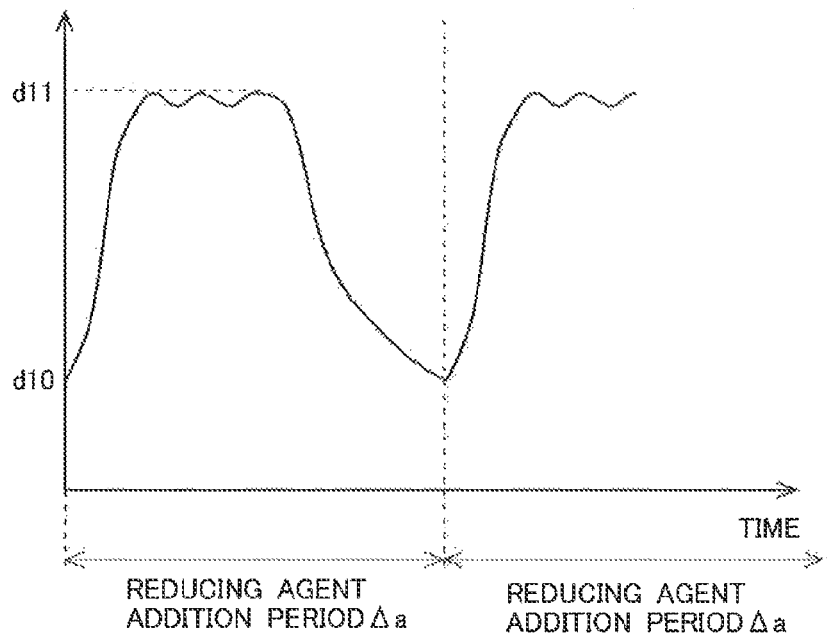
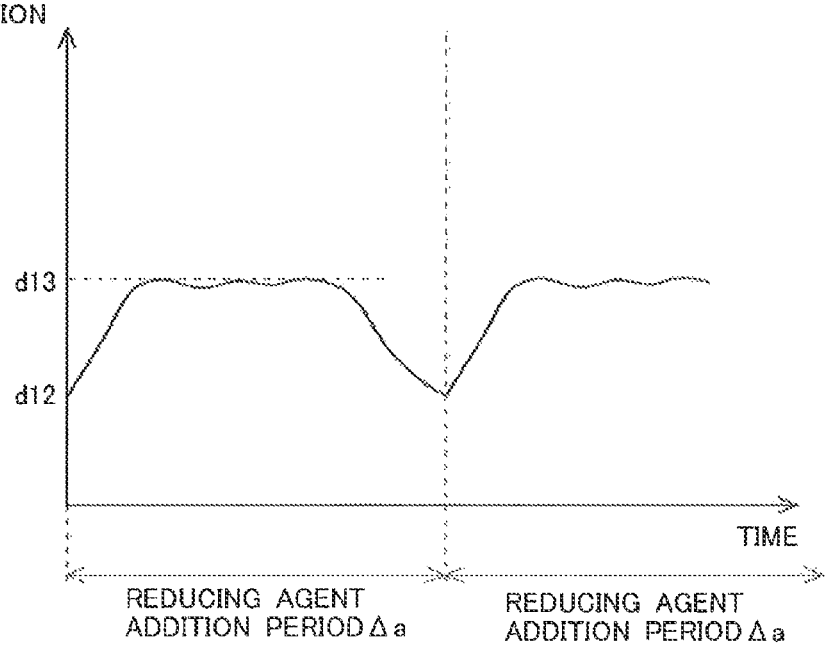

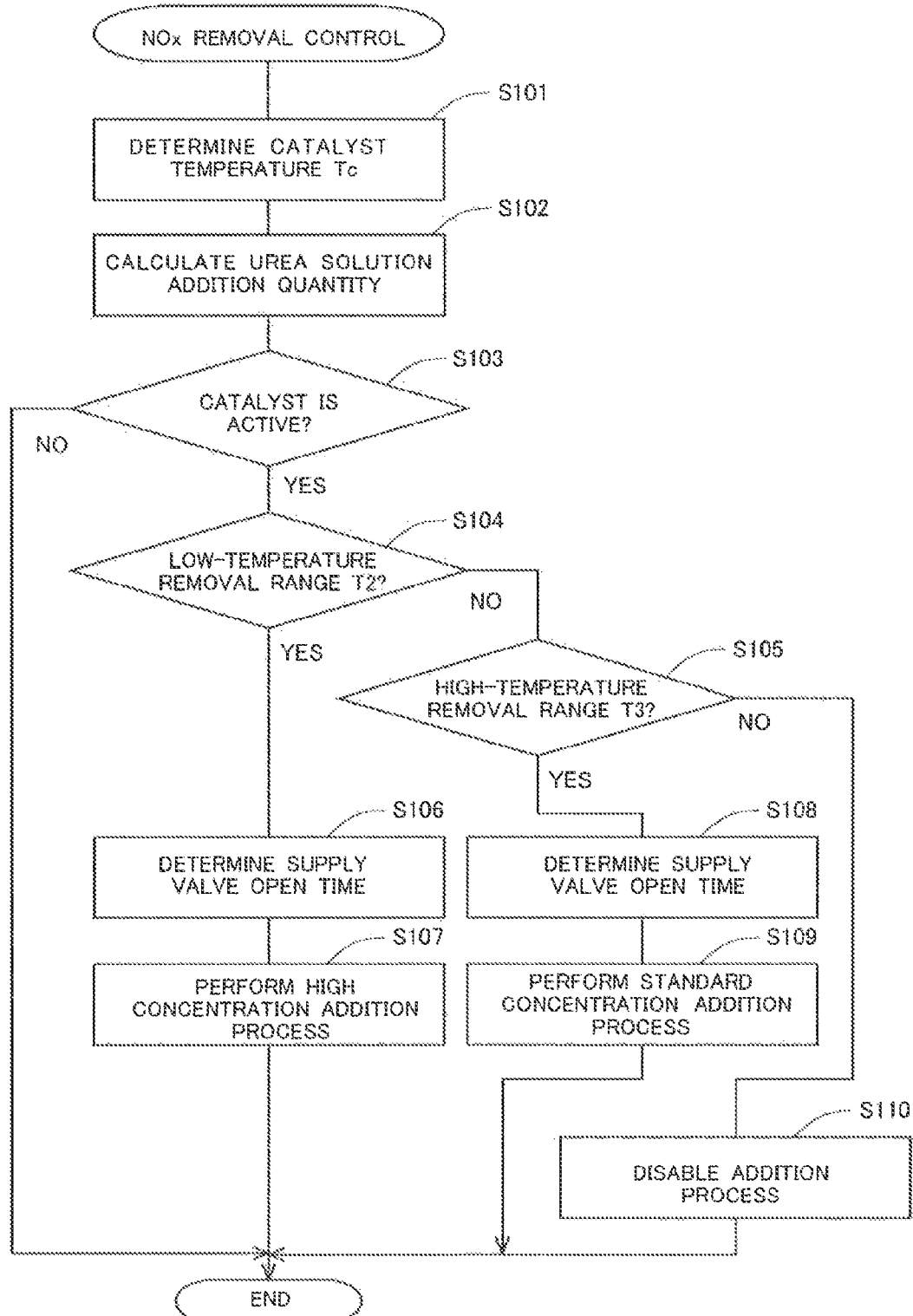
[Fig. 9]

[Fig. 10]
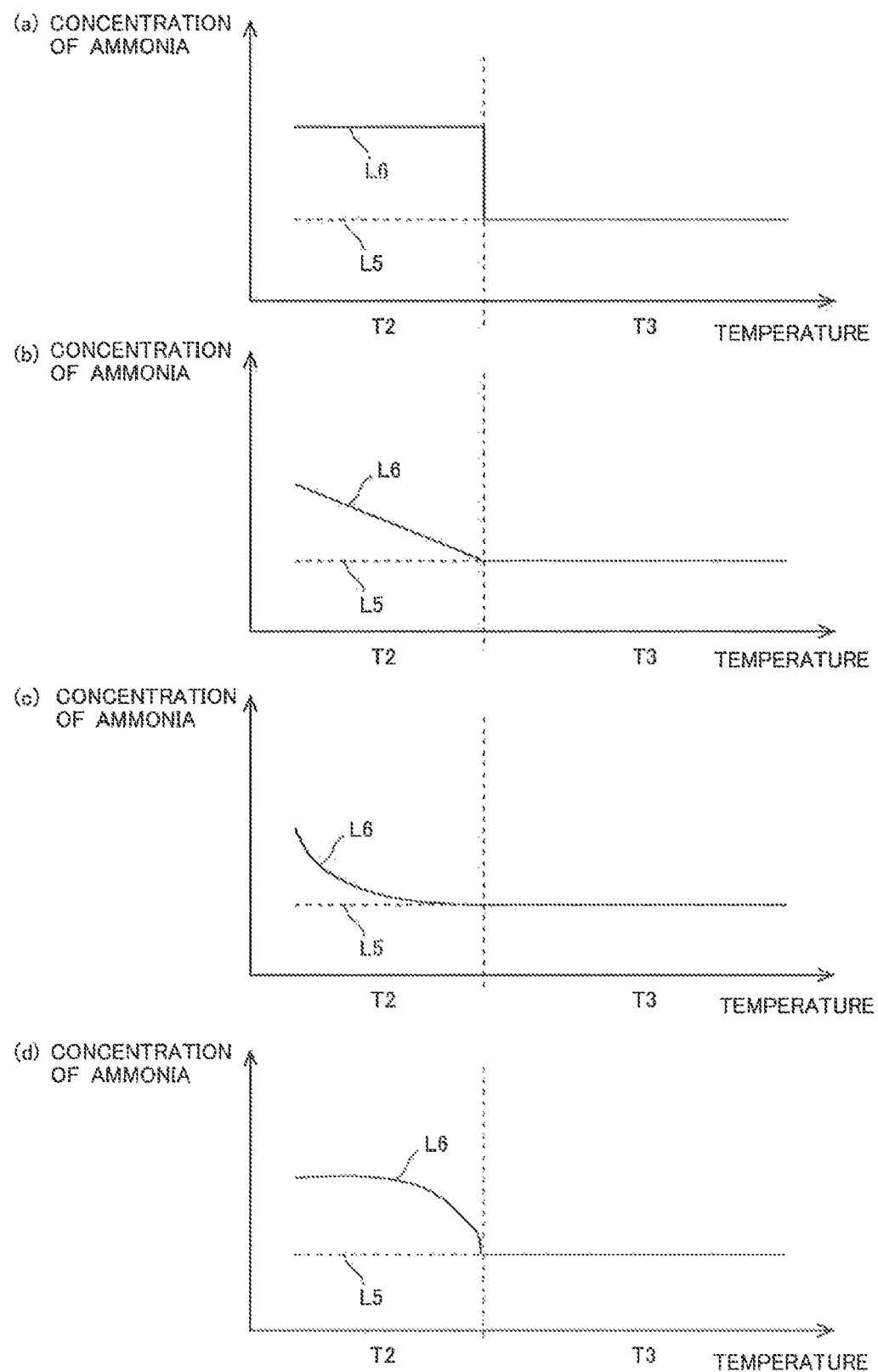

[Fig. 11]
(a)
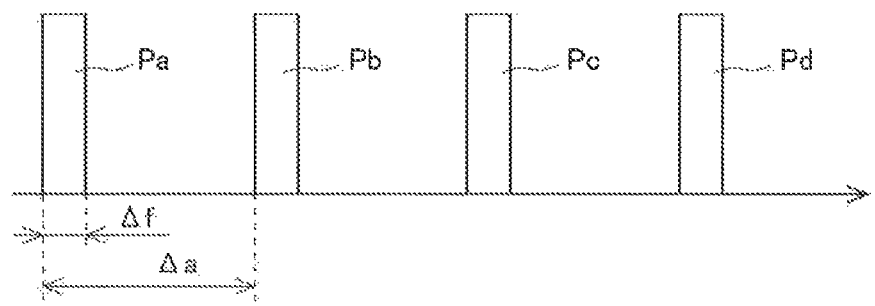
(b)
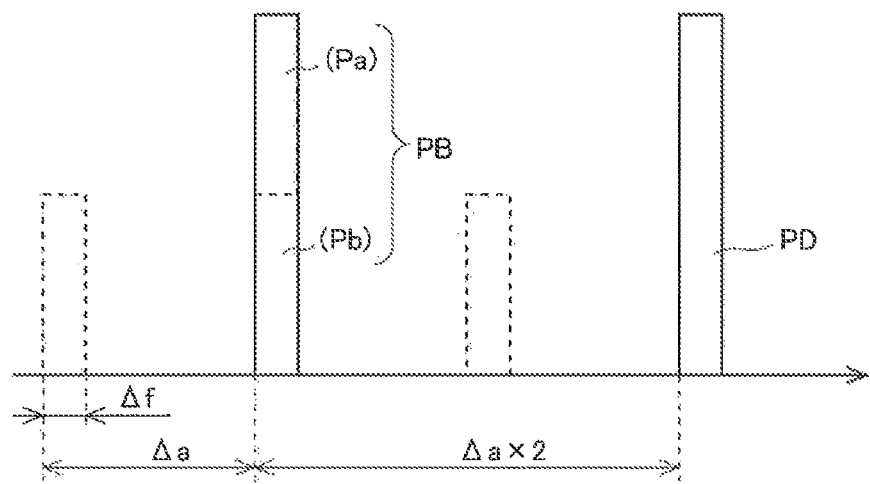

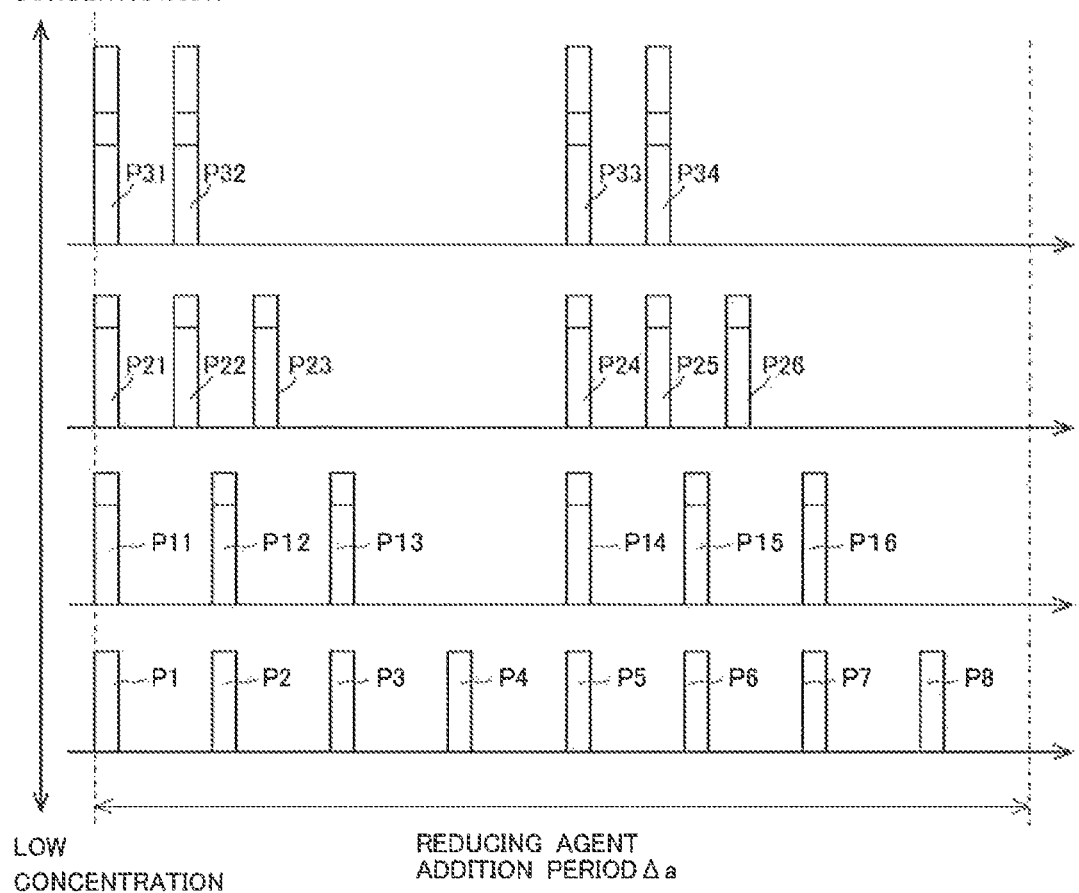

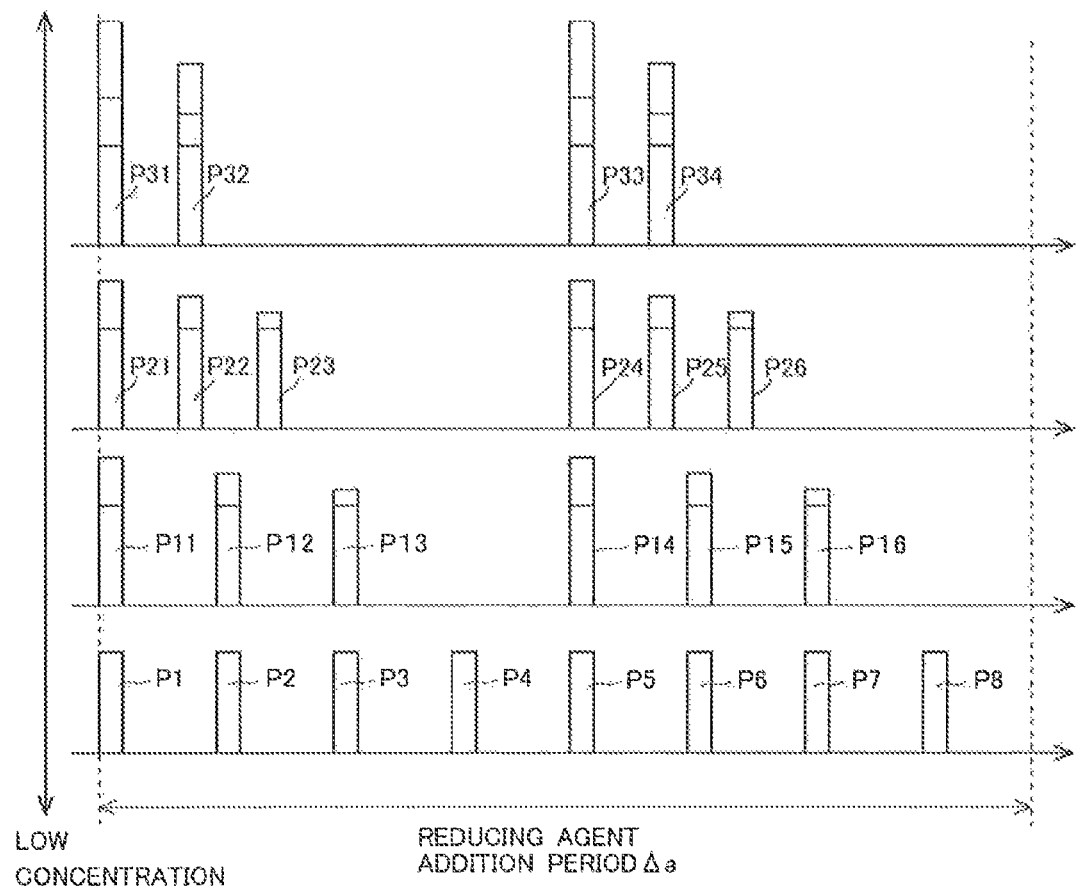
[Fig. 13]

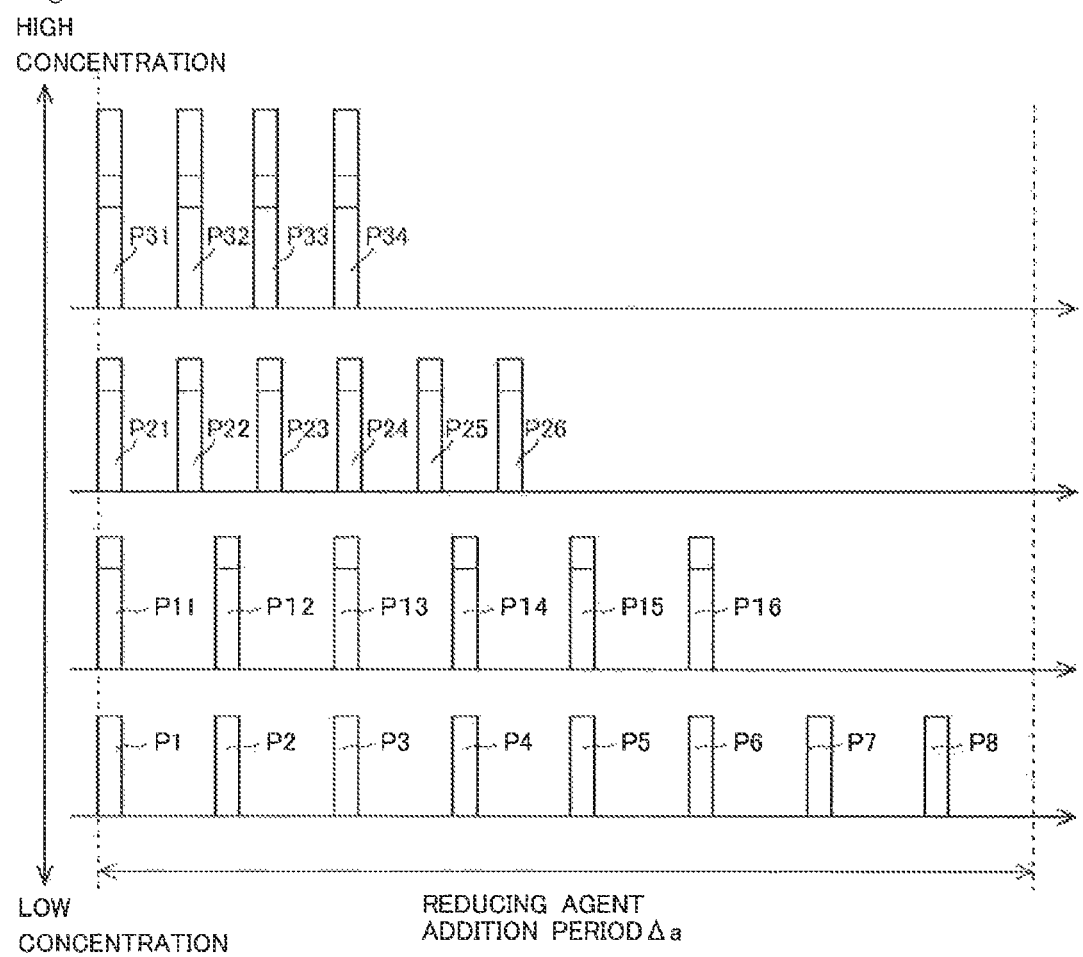

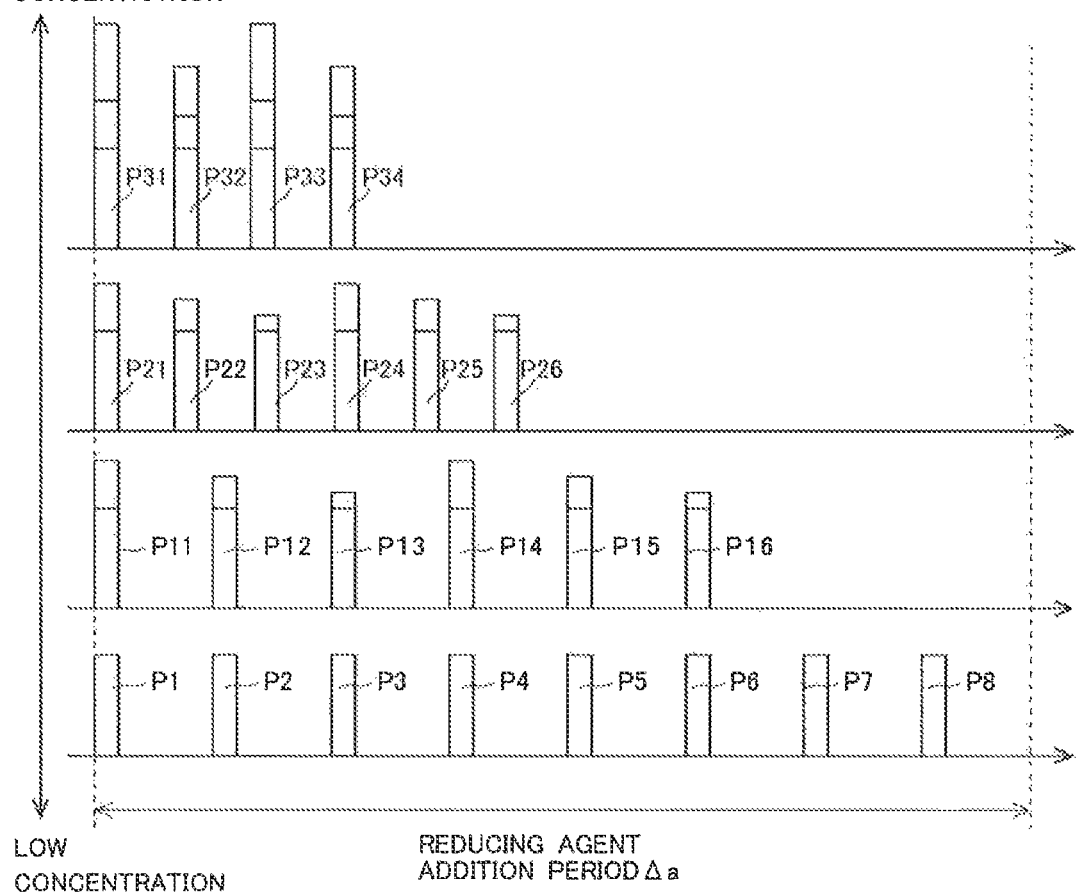

[Fig. 16]
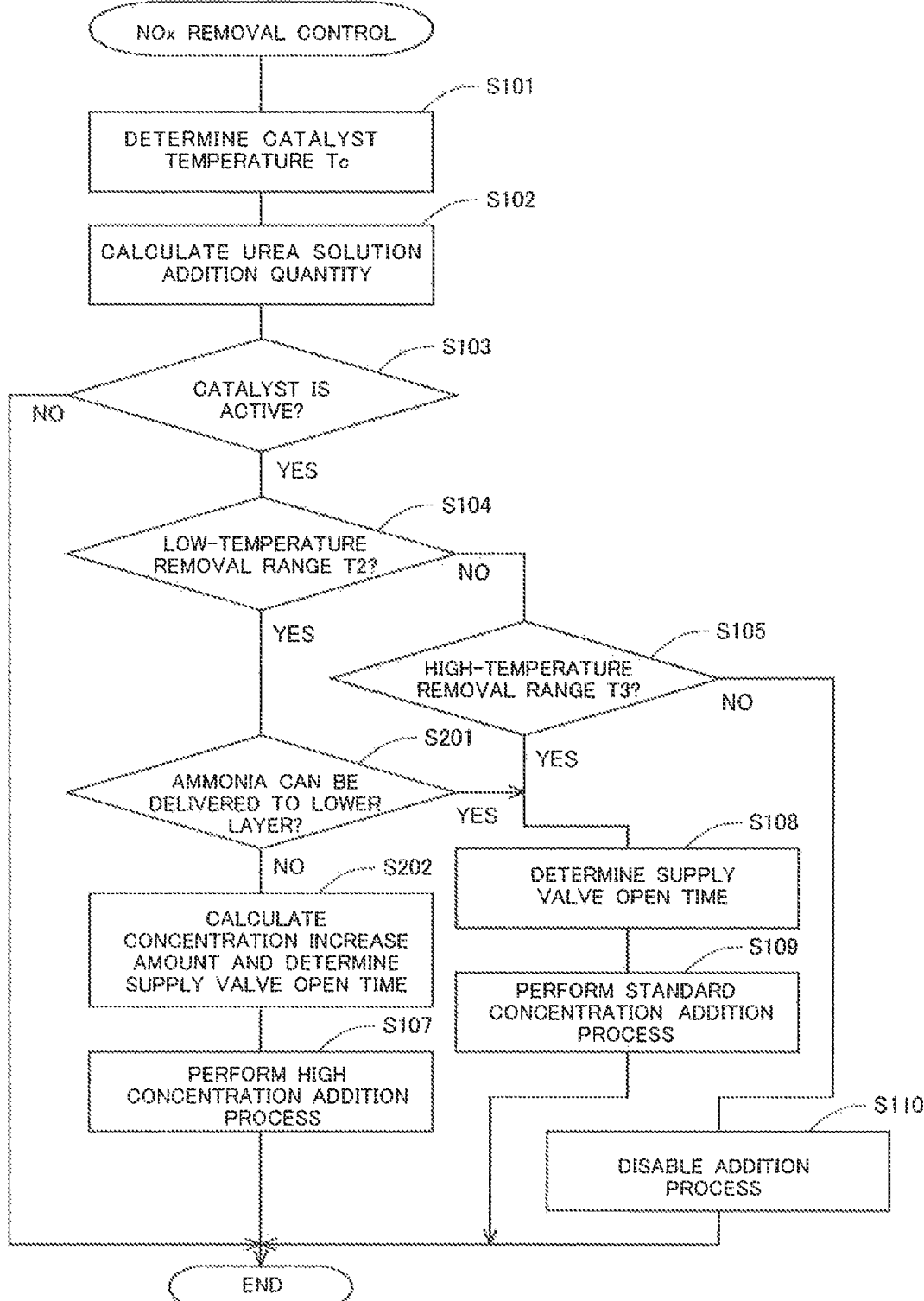

[Fig. 17A]
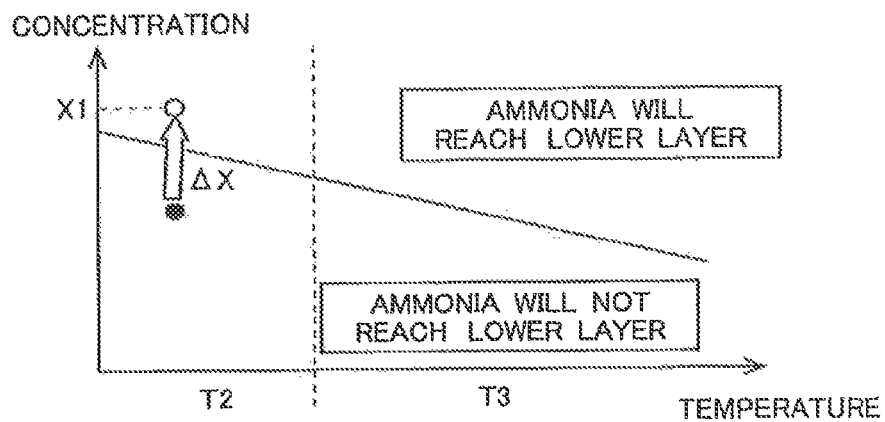
[Fig. 17B]
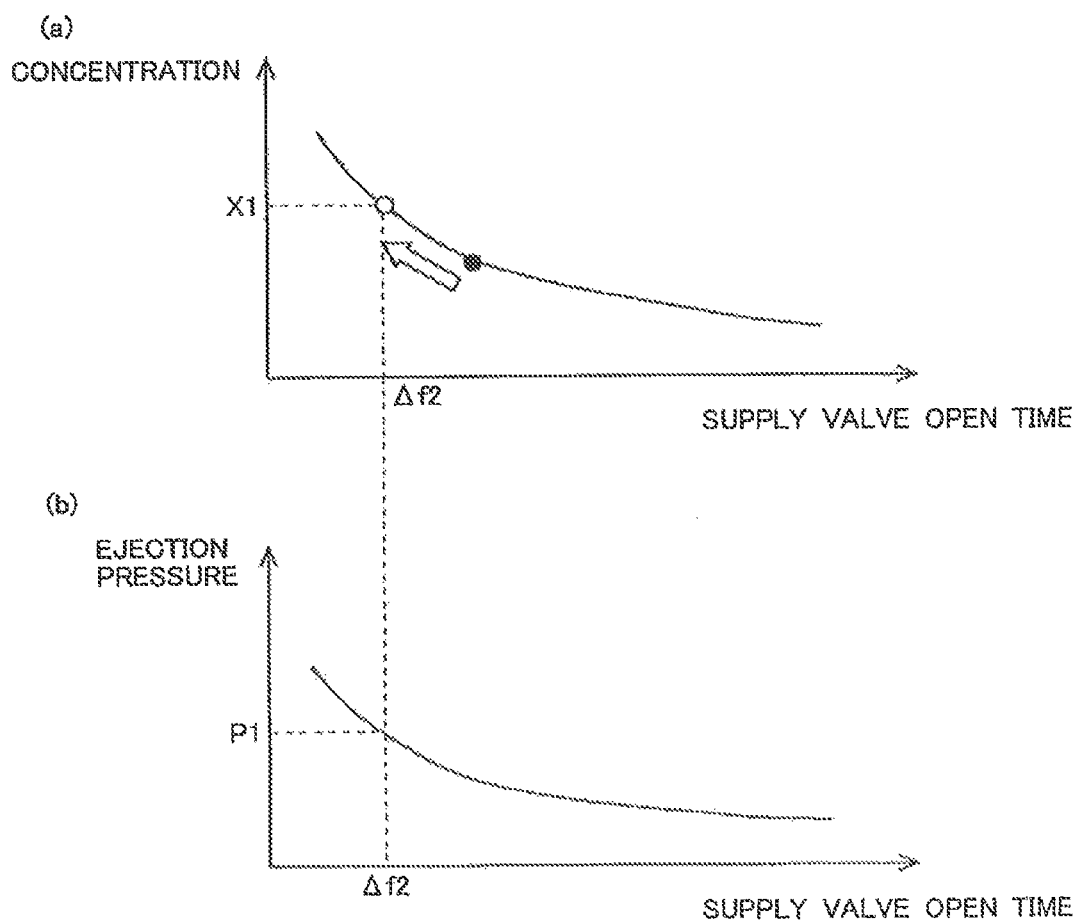

[Fig. 17C]
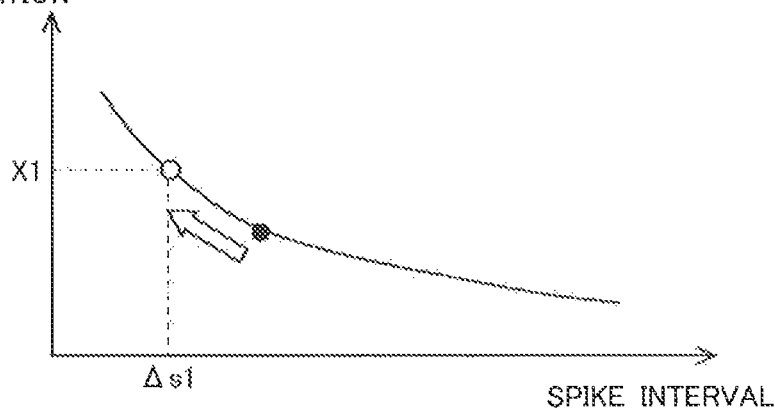
[Fig. 18]
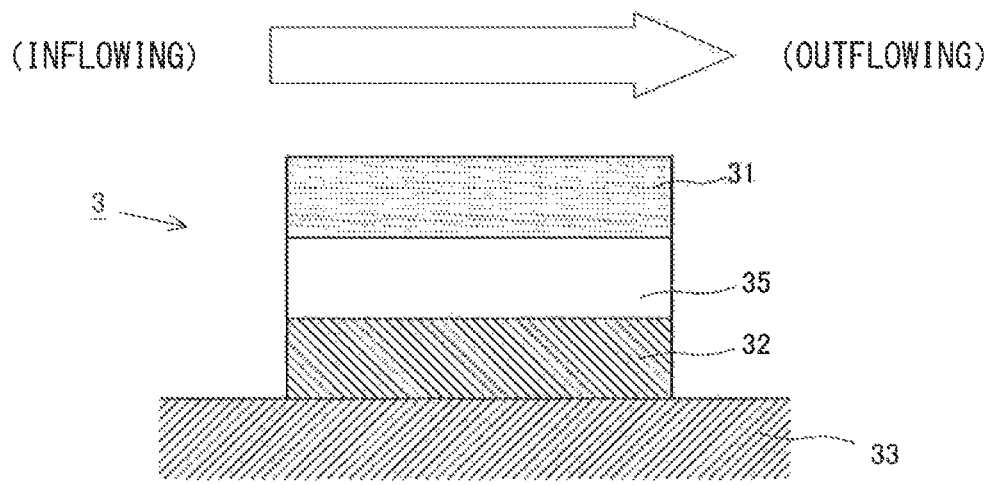

EXHAUST GAS PURIFICATION APPARATUS FOR INTERNAL COMBUSTION ENGINE

This application claims the benefits of Japanese Patent Application No. 2015-083778, filed on Apr. 15, 2015, and of Japanese Patent Application No. 2015-220750, filed on Nov. 10, 2015, each of which is incorporated by reference herein in its entirety.

BACKGROUND

Technical Field

The present disclosure relates to an exhaust gas purification apparatus for an internal combustion engine.

Description of the Related Art

There are internal combustion engines provided with a catalyst for selective catalytic reduction of NOx (which will be sometimes simply referred to as "NOx catalyst" hereinafter) for reducing NOx in the exhaust gas provided in an exhaust passage. A typical NOx catalyst may include at least one kind of active component such as Fe or Cu having the function of selectively reducing NOx, which is carried in micropores of zeolite by ion exchange.

With the NOx catalyst, NOx in the exhaust gas may be selectively reduced with supply of a reducing agent such as ammonia. When the catalyst temperature of the NOx catalyst is low, satisfactory NOx removal efficiency tends not to be achieved. As a countermeasure, PTL 1 discloses a NOx catalyst constructed in a two-layer structure including a lower catalyst layer and an upper catalyst layer with the lower catalyst layer having oxidation function exercised by noble metal and the upper layer not having oxidation function but having only reduction function. PTL 1 describes oxidation of NO (nitrogen monoxide) into $NO_2$ by the lower catalyst layer and the use of the resultant $NO_2$ for reduction of NOx by the upper catalyst layer with ammonia.

CITATION LIST

Patent Literature

PTL 1: Japanese Patent Application Laid-Open No. 2008-279334

SUMMARY

In the above-described prior art, the NOx catalyst may be constructed in a two layer structure including a lower catalyst layer and an upper catalyst layer, NO in the exhaust gas can be oxidized into $NO_2$ by the oxidation capability of the lower catalyst layer, and the resultant $NO_2$ can be used for reduction of NOx by the upper catalyst layer. In this NOx catalyst having a two-layer structure, selective reduction of NOx may be performed only by the upper catalyst, and therefore the overall NOx reduction capability of the NOx catalyst may not be so high.

As a modification of the NOx catalyst having a two-layer structure, the lower catalyst layer may be adapted to also have the function of reducing NOx with reduction characteristics showing high NOx reduction capability at temperatures lower than temperatures at which reduction characteristics of the upper catalyst layer shows high reduction capability. The reason why the lower catalyst layer may be adapted to have the capability of reducing NOx at lower temperatures is that if the upper catalyst layer were adapted to have the capability of reducing NOx at lower temperatures, ammonia that is intended to serve as a reducing agent for reduction of NOx may be oxidized into NOx by the upper catalyst layer into which the exhaust gas tends to flow when the temperature of the NOx catalyst is high, consequently leading to a decrease in the NOx removal rate of the NOx catalyst. In this type of NOx catalyst, when the temperature of the NOx catalyst is relatively low, as is the case for example during the period not so long after the start of the internal combustion engine, while the lower catalyst layer is expected to selectively reduce NOx, the reducing agent adsorbing capability of the upper catalyst layer may tend to be high at relatively low NOx catalyst temperatures. Therefore, even if a reducing agent is supplied to the NOx catalyst with the exhaust gas, the reducing agent may be adsorbed by the upper catalyst layer and not apt to be delivered to the lower catalyst layer. Consequently, it may be difficult to achieve efficient reduction of NOx by the NOx catalyst when its temperature is low.

Embodiments of the present disclosure provide a technology that may enable efficient reduction of NOx by a NOx catalyst both when its temperature is low, and when its temperature is high, and may improve the efficiency of reduction of NOx by the NOx catalyst, when its temperature is low.

Embodiments of the present disclosure include techniques of adding reducing agent to exhaust gas flowing into a selective catalytic reduction NOx catalyst having a low-temperature catalyst layer and a high-temperature catalyst layer that have different NOx reducing capabilities depending on the temperature. The reducing agent concentration in a reducing agent atmosphere during a period in which the reducing agent is added may be controlled in a manner depending on the temperature of the selective catalytic reduction NOx catalyst. The reducing agent atmosphere can be formed by the addition of reducing agent to the exhaust gas, and the concentration of the reducing agent (reducing agent concentration) in the reducing agent atmosphere may be defined as the proportion of the added reducing agent in the reducing agent atmosphere (i.e. the exhaust gas containing the reducing agent) per unit time. Thus, the reducing agent concentration can be calculated by dividing the quantity of the reducing agent added per unit time by the exhaust gas flow rate per unit time. Controlling the reducing agent concentration in the reducing agent atmosphere during the reducing agent addition period may change the extent of diffusion of the added reducing agent in the selective catalytic reduction NOx catalyst. Therefore, controlling the reducing agent concentration may enable appropriate delivery of the reducing agent to the low-temperature catalyst layer when the temperature of the selective catalytic reduction NOx catalyst is low, and thereby may enable the low-temperature catalyst layer to exercise its NOx reducing capability appropriately.

More specifically, an exhaust gas purification apparatus for an internal combustion engine according to embodiments of the present disclosure may comprises: a selective catalytic reduction NOx catalyst having a catalyst substrate and a plurality of catalyst layers made up of catalyst particles having the property of selectively reducing NOx with a reducing agent derived from ammonia arranged on the catalyst substrate, the catalyst layers including at least a high-temperature catalyst layer having high capability of reducing NOx at high temperatures and a low-temperature catalyst layer having higher capability of reducing NOx at low temperatures than that of said high-temperature catalyst layer and arranged closer to said catalyst substrate than said high-temperature catalyst layer; a supply valve that adds a specific addition quantity of reducing agent for reducing NOx to exhaust gas flowing into said selective catalytic reduction NOx catalyst; and a controller comprising at least one processor configured to control addition of the reducing agent by said supply valve in such a way that the reducing agent concentration in a reducing agent atmosphere formed in the exhaust gas flowing into said selective reduction NOx catalyst is made higher in the case where the temperature of said selective catalytic reduction NOx catalyst is in a specific low temperature range in which the NOx reducing capability of said low-temperature catalyst layer is higher than the NOx reducing capability of said high-temperature catalyst layer than in the case where the temperature of said selective catalytic reduction NOx catalyst is in a specific high temperature range that is higher than said specific low temperature range and in which the NOx reducing capability of said high-temperature catalyst layer is higher than the NOx reducing capability of said low-temperature catalyst layer, during a reducing agent addition period from the time at which said specific addition quantity of reducing agent is added by said supply valve to the time at which said specific addition quantity of reducing agent is added by said supply valve next time, provided that said specific addition quantity is the same.

The selective catalytic reduction NOx catalyst (NOx catalyst) used in the exhaust gas purification apparatus for an internal combustion engine according to embodiments of the present disclosure may be made up of a catalyst substrate and a plurality of catalyst layers arranged on the catalyst substrate and including at least the aforementioned low-temperature catalyst layer and the aforementioned high-temperature catalyst layer. Embodiments of the present disclosure do not exclude the inclusion of a catalyst layer(s) other than the low-temperature catalyst layer and the high-temperature catalyst layer in the aforementioned NOx catalyst. Since the low-temperature catalyst layer may be located on the catalyst substrate side of the high-temperature catalyst layer, a most part of NOx to be reduced by the NOx catalyst may flow firstly into the high-temperature catalyst layer from outside the catalyst and thereafter flow into the low-temperature catalyst layer. Since the low-temperature catalyst layer may be located under the high temperature catalyst layer if the catalyst substrate is regarded as the base, the position of the low-temperature catalyst layer relative to the high-temperature catalyst layer will be described as "lower", and conversely the position of the high-temperature catalyst layer relative to the low-temperature catalyst layer will be described as "upper", in some cases.

The low-temperature catalyst layer may exhibit a NOx reducing capability superior to the high-temperature catalyst layer when the catalyst temperature is in a specific low temperature range (which will be sometimes described as "in the low temperature state of the NOx catalyst" hereinafter). However, as the catalyst temperature increases to enter a specific high temperature range, the oxidizing capability of the low-temperature catalyst layer may tend to become high, so that it may oxidize the reducing agent to increase the quantity of NOx in some cases. (The state in which the catalyst temperature is in the specific high temperature range will be sometimes described as "the high temperature state of the NOx catalyst" hereinafter.) Therefore, arranging the low-temperature catalyst layer under the high-temperature catalyst layer can make it unlikely for the reducing agent to reach the low-temperature catalyst layer in the high temperature state of the NOx catalyst, thereby making it possible to maintain the efficiency of reduction of NOx in the NOx catalyst in the high temperature state at a satisfactory level.

In the case where the low-temperature catalyst layer is arranged under the high-temperature catalyst layer, it can be difficult to deliver the reducing agent for promoting the NOx reduction reaction by the low-temperature catalyst layer in the low temperature state. This is because the high-temperature catalyst layer may intervene in the course of delivery of the reducing agent to the low-temperature catalyst layer and the reducing agent adsorbing capability of the high-temperature catalyst layer is not so small in the low temperature state. This means that the high-temperature catalyst layer may be an obstacle in delivering the reducing agent to the low-temperature catalyst layer. However, if the quantity of reducing agent added to the exhaust gas is increased to deliver the reducing agent to the low-temperature layer, the reducing agent may not necessarily be delivered to the low-temperature catalyst layer, but the possibility of slipping of the reducing agent downstream of the NOx catalyst may increase.

In view of the above circumstances, in the exhaust gas purification apparatus according to embodiments of the present disclosure, the controller may control addition of the reducing agent by the supply valve in such a way that the reducing agent concentration in the reducing agent atmosphere is higher when the temperature of the NOx catalyst is low than when the temperature of the NOx catalyst is high. The specific addition quantity added by the supply valve may be an addition quantity of the reducing agent adapted to the quantity of NOx flowing into the NOx catalyst in a certain period of time that is sufficiently shorter than the period over which the exhaust gas flows into the NOx catalyst continuously. The specific addition quantity can be determined by taking account of conditions of reduction of NOx by the NOx catalyst, such as the amount of ammonia adsorbed in the NOx catalyst and the concentration of NOx in the exhaust gas. When the exhaust gas is flowing into the NOx catalyst continuously, the reducing agent addition period, which may be defined as the period from the time at which the specific addition quantity of reducing agent is added by the supply valve to the time at which the specific addition quantity of reducing agent is added by the supply valve next time, is repeated successively. Addition of the reducing agent to the exhaust gas may be performed at least once in each reducing agent addition period in such a way that the total quantity of the reducing agent added in the reducing agent addition period amounts to the specific addition quantity. In the low temperature state of the NOx catalyst, the controller as described above may control the addition of the reducing agent in such a way as to form a reducing agent atmosphere having a concentration higher than in the high temperature state in the exhaust gas flowing into the NOx catalyst, without increasing the quantity of the reducing agent added to the exhaust gas during the reducing agent addition period.

As a high-concentration reducing agent atmosphere is formed by the controller during the reducing agent addition period in the low temperature state of the NOx catalyst, and the reducing agent atmosphere thus formed enters the NOx catalyst from the high-temperature catalyst layer side, a portion of the reducing agent atmosphere may be delivered to the low-temperature catalyst layer located on the catalyst substrate side (lower side). Consequently, the reducing agent can be supplied more efficiently to the low-temperature catalyst layer, thereby enabling the low-temperature catalyst layer to exercise its NOx reducing capability effectively in the low temperature state of the NOx catalyst. In connection with this, since the quantity of supply of the reducing agent may not be increased in forming the high-concentration reducing agent atmosphere, slipping of the reducing agent downstream of the NOx catalyst may be prevented reliably.

As above, the exhaust gas purification apparatus for an internal combustion engine according to embodiments of the present disclosure may deliver the reducing agent to the low-temperature catalyst layer through the high-temperature catalyst layer with reliability even in the low temperature state of the NOx catalyst, and thereby may achieve efficient reduction of NOx in both the low temperature state and the high temperature state, in particular efficient reduction NOx by the NOx catalyst in the low temperature state.

In the above-described exhaust gas purification apparatus for an internal combustion engine, as said specific addition quantity of reducing agent is added to the exhaust gas by said supply valve, the reducing agent concentration in said reducing agent atmosphere may change with time. In connection with this, said controller may control addition of the reducing agent by said supply valve in such a way that the difference between the highest value and the lowest value of the reducing agent concentration in said reducing agent atmosphere during said reducing agent addition period in the case where the temperature of said selective catalytic reduction NOx catalyst is in said specific low temperature range is larger than the difference between the highest value and the lowest value of the reducing agent concentration in said reducing agent atmosphere in the case where the temperature of said selective catalytic reduction NOx catalyst is in said specific high temperature range. Thus, by increasing the difference between the highest value and the lowest value of the reducing agent concentration in the reducing agent atmosphere when the NOx catalyst is in the low temperature state, a reducing agent atmosphere having a higher concentration may be formed in the exhaust gas. Consequently, the reducing agent can be supplied effectively to the low-temperature catalyst layer when the NOx catalyst is in the low temperature state, as described above.

In the case where the reducing agent concentration in said reducing agent atmosphere changes with time as said specific addition quantity of reducing agent is added to the exhaust gas by said supply valve, said controller may control addition of the reducing agent by said supply valve in such a way that the peak value of the reducing agent concentration in said reducing agent atmosphere during said reducing agent addition period in the case where the temperature of said selective catalytic reduction NOx catalyst is in said specific low temperature range is higher than the peak value of the reducing agent concentration in said reducing agent atmosphere in the case where the temperature of said selective catalytic reduction NOx catalyst is in said specific high temperature range. By increasing the peak value of the reducing agent concentration in the reducing agent atmosphere when the NOx catalyst is in the low temperature state, a reducing agent atmosphere having a higher concentration may be formed in the exhaust gas. Consequently, the reducing agent can be supplied effectively to the low-temperature catalyst layer.

In the exhaust gas purification apparatus for an internal combustion engine described in the foregoing, when said specific addition quantity of reducing agent is added to the exhaust gas in a manner in which addition of the reducing agent and suspension of addition are alternated during said reducing agent addition period, said controller may make the interval between successive additions of the reducing agent shorter to thereby make the reducing agent concentration in the exhaust gas flowing into said selective catalytic reduction NOx catalyst higher in the case where the temperature of said selective catalytic reduction NOx catalyst is in said specific low temperature range than in the case where the temperature of said selective catalytic reduction NOx catalyst is in said specific high temperature range. In other words, in cases where a mode (e.g. spike mode) in which a specific addition quantity of reducing agent is added in total in said reducing agent addition period by performing addition of reducing agent multiple times (in spikes), the shorter the addition interval (which will be sometimes referred to as "spike interval" hereinafter) as a parameter relating to the spike mode is, the higher the reducing agent concentration established during the reducing agent addition period may tend to be. Therefore, a reducing agent concentration enabling delivery of the reducing agent to the low-temperature catalyst layer of the NOx catalyst may be established utilizing this tendency.

As an alternative method of controlling the reducing agent concentration, in the exhaust gas purification apparatus for an internal combustion engine described in the foregoing, said supply valve may be a supply valve that adds said reducing agent to the exhaust gas, and when said specific addition quantity of reducing agent is added to the exhaust gas by said supply valve, said controller may make the ejection pressure in ejecting the reducing agent by said supply valve higher to thereby make the reducing agent concentration in the exhaust gas flowing into said selective catalytic reduction NOx catalyst higher in the case where the temperature of said selective catalytic reduction NOx catalyst is in said specific low temperature range than in the case where the temperature of said selective catalytic reduction NOx catalyst is in said specific high temperature range. In other words, in cases where a mode in which the quantity of reducing agent added to the exhaust gas per unit time is changed by controlling the ejection pressure of the supply valve to thereby change the reducing agent concentration in the exhaust gas, the higher the ejection pressure is, the higher the reducing agent concentration established during the reducing agent addition period may tend to be. Therefore, a reducing agent concentration enabling delivery of the reducing agent to the low-temperature catalyst layer of the NOx catalyst may be established utilizing this tendency.

In the exhaust gas purification apparatus for an internal combustion engine described in the foregoing, the controller may determine whether the reducing agent will reach said low-temperature catalyst layer when the temperature of said selective catalytic reduction NOx catalyst is in said specific low temperature range, and may calculate an amount of increase by which the reducing agent concentration in the exhaust gas flowing into said selective catalytic reduction NOx catalyst is to be increased by said controller so as to cause the reducing agent to reach said low-temperature catalyst layer, when it is determined that the reducing agent will not reach said low-temperature catalyst layer. In this case, said controller may control addition of the reducing agent by said supply valve in accordance with said amount of increase of the reducing agent concentration.

With the above feature, the formation of the above-described high-concentration reducing agent atmosphere may be performed by the controller when it is determined that the reducing agent will not reach the low-temperature catalyst layer when the NOx catalyst is in the low temperature state. In other words, even when the NOx catalyst is in the low-temperature state, the formation of the above-described high-concentration reducing agent atmosphere may not be performed if it is determined that the reducing agent will reach the low-temperature catalyst layer. The determination can be performed based on a parameter relating to the reducing agent adsorption capability of the high-temperature catalyst layer, which may be an obstacle to delivery of reducing agent to the underlying low-temperature catalyst layer. Such a parameter may be, for example, the temperature of the NOx catalyst. Since the formation of high-concentration reducing agent atmosphere by the controller can be performed in accordance with the amount of increase of the reducing agent concentration calculated, a high-concentration reducing agent atmosphere that enables delivery of the reducing agent with improved reliability in the low temperature state can be formed. The amount of increase of the reducing agent concentration can be calculated taking account of parameters relating to the reducing agent absorption capability used in the determination.

In the exhaust gas purification apparatus for an internal combustion engine described in the foregoing, the low-temperature catalyst layer may contain catalyst particles produced by ion-exchanging crystalline zeolite with Cu, and the high-temperature catalyst layer may contain catalyst particles produced by ion-exchanging crystalline zeolite with Fe. Alternatively, the low-temperature catalyst layer may contain catalyst particles composed of SnMnCeOx, which is a manganese oxide. In this case, the high-temperature catalyst layer may contain catalyst particles produced by ion-exchanging crystalline zeolite with Fe, similarly. In the above case, Sn and Ce are added in order to improve the durability of the NOx catalyst. Therefore, the term "manganese oxide" in the context of embodiments of the present disclosure denotes manganese oxides to which a component(s) other than Sn and Ce is added for the purpose of improving the durability or other purposes and manganese oxides to which other components are not added. Embodiments of the present invention do not exclude low-temperature catalyst layers and high-temperature catalyst layers containing catalyst particle other than those mentioned above.

Embodiments of the present disclosure may enable efficient reduction of NOx by an NOx catalyst both when its temperature is low and when its temperature is high and improve the efficiency of reduction of NOx by the NOx catalyst, in particular when its temperature is low.

BRIEF DESCRIPTION OF THE DRAWINGS

FIG. 1A is a diagram showing an exhaust gas purification apparatus for an internal combustion engine that uses a selective catalytic reduction NOx catalyst including two catalyst layers.

FIG. 1B is a diagram showing the structure of the selective catalytic reduction NOx catalyst used in the exhaust gas purification apparatus shown in FIG. 1A.

FIG. 2 is a graph showing relationship between the catalyst temperature and the capability of selectively reducing NOx for Cu and Fe as active components in the selective catalytic reduction NOx catalyst.

FIG. 3A is a diagram schematically showing a first mode of addition of urea solution performed in the exhaust gas purification apparatus for an internal combustion engine according to embodiments of the present disclosure.

FIG. 3B schematically illustrates how ammonia as a reducing agent diffuses in the selective catalytic reduction NOx catalyst when addition of urea solution shown in FIG. 3A is performed.

FIG. 4 shows relationships between the temperature of the selective catalytic reduction NOx catalyst and quantities such as the supply valve open time in the case where addition of urea solution shown in FIG. 3A is performed.

FIG. 5 shows the change of the reducing agent concentration with time in the reducing agent atmosphere formed in the exhaust gas flowing into the selective catalytic reduction NOx catalyst in the case where addition of urea solution shown in FIG. 3A is performed.

FIG. 6 is a diagram schematically showing a second mode of addition of urea solution performed in the exhaust gas purification apparatus for an internal combustion engine according to embodiments of the present disclosure.

FIG. 7 shows relationships between the temperature of the selective catalytic reduction NOx catalyst and quantities such as the spike interval in the case where addition of urea solution shown in FIG. 6 is performed.

FIG. 8 shows the change of the reducing agent concentration with time in the reducing agent atmosphere formed in the exhaust gas flowing into the selective catalytic reduction NOx catalyst in the case where addition of urea solution shown in FIG. 6 is performed.

FIG. 9 is a flow chart of a first NOx removal control performed in the exhaust gas purification apparatus for an internal combustion engine according to embodiments of the present disclosure.

FIG. 10 is a diagram schematically showing a third mode of addition of urea solution performed in the exhaust gas purification apparatus for an internal combustion engine according to embodiments of the present disclosure.

FIG. 11 is a diagram schematically showing a fourth mode of addition of urea solution performed in the exhaust gas purification apparatus for an internal combustion engine according to embodiments of the present disclosure.

FIG. 12 is a diagram schematically showing a fifth mode of addition of urea solution performed in the exhaust gas purification apparatus for an internal combustion engine according to embodiments of the present disclosure.

FIG. 13 is a diagram schematically showing a sixth mode of addition of urea solution performed in the exhaust gas purification apparatus for an internal combustion engine according to embodiments of the present disclosure.

FIG. 14 is a diagram schematically showing a seventh mode of addition of urea solution performed in the exhaust gas purification apparatus for an internal combustion engine according to embodiments of the present disclosure.

FIG. 15 is a diagram schematically showing a eighth mode of addition of urea solution performed in the exhaust gas purification apparatus for an internal combustion engine according to embodiments of the present disclosure.

FIG. 16 is a flow chart of a second NOx removal control performed in the exhaust gas purification apparatus for an internal combustion engine according to embodiments of the present disclosure.

FIG. 17A shows a control map used in the NOx removal control shown in FIG. 16 to determine whether or not ammonia can reach the low-temperature catalyst layer.

FIG. 17B shows a control map used in the NOx removal control shown in FIG. 16 to determine the supply valve open time and the ejection pressure for high concentration addition process.

FIG. 17C shows a control map used in the NOx removal control shown in FIG. 16 to determine the spike interval for high concentration addition process.

FIG. 18 is a diagram showing a selective catalytic reduction NOx catalyst including three catalyst layers, which can be used in the exhaust gas purification apparatus for an internal combustion engine according to embodiments of the present disclosure.

DETAILED DESCRIPTION

In the following, examples of embodiments of the present disclosure will be described with reference to the drawings.

The dimensions, materials, shapes, relative arrangements, and other features of the components that will be described in connection with the examples are not intended to limit the technical scope of the present disclosure only to them, unless particularly stated.

An example of a catalyst for selective catalytic reduction of NOx (which will be sometimes simply referred to as "NOx catalyst" hereinafter) according to the present disclosure will be described with reference to the accompanying drawings. FIG. 1A shows an exhaust gas purification apparatus of an internal combustion engine 1 provided with an NOx catalyst 3. The internal combustion engine 1 shown in FIG. 1A is a diesel engine for driving a vehicle. The internal combustion engine 1 is not limited to a diesel engine, but it may be other types of engine such as a gasoline engine. In FIG. 1A, some components of the internal combustion engine 1 such as an EGR apparatus for recirculation of a part of the exhaust gas flowing in the exhaust passage 2 to the intake system are not shown.

In the exhaust passage 2 of the internal combustion engine 1, there is provided an NOx catalyst 3 that selectively reduce NOx in the exhaust gas using ammonia as a reducing agent. In order to produce ammonia serving as a reducing agent in the NOx catalyst 3, urea solution (aqueous urea solution) as a precursor of ammonia is stored in a urea tank 4. The urea solution is added to the exhaust gas by a supply valve 5 arranged upstream of the NOx catalyst 3. The urea solution added through the supply valve 5 is hydrolyzed by the effect of heat of the exhaust gas to produce ammonia. The ammonia thus produced flows into the NOx catalyst 3 and is adsorbed by the NOx catalyst 3. Consequently, reduction reaction of the adsorbed ammonia and NOx in the exhaust gas occurs. Thus, NOx is removed by reduction. In this example urea solution is added through the supply valve 5 as described above. Alternatively, ammonia or ammonia solution may be added directly into the exhaust gas. Moreover, an oxidation catalyst may be provided downstream of the NOx catalyst 3 to oxidize ammonia slipping through the NOx catalyst 3.

The NOx catalyst 3 is produced by applying a slurry containing catalyst particles to a catalyst substrate 33 and thereafter drying and sintering it. Specifically, as shown in FIG. 1B, the NOx catalyst 3 has a first catalyst layer 31 and a second catalyst layer 32. The second catalyst layer 32 is arranged adjacent to the catalyst substrate 33, and the first catalyst layer 31 is arranged close to the exhaust gas flow in the exhaust passage 2. Thus, the second catalyst layer 32 is arranged between the first catalyst layer 31 and the catalyst substrate 33, and NOx in the exhaust gas enters the first catalyst layer 31 and diffuses through it to reach the second catalyst layer 32.

Now we describe the catalyst particles that constitute the first catalyst layer 31. The catalyst particles are produced by partly ion-exchanging crystalline zeolite with Fe, which is an active component having the property of selectively reducing NOx in the exhaust gas. The catalyst particles are bound by a binder to constitute the first catalyst layer 31. The exhaust gas flows into the first catalyst layer 31 as such, and NOx in the exhaust gas diffuses in the pores of the zeolite in the first catalyst layer 31 together with ammonia as reducing agent, so that reduction reaction of NOx occurs.

In this example, Fe is used in the first catalyst layer 31 of the NOx catalyst 3 as an active component having the property of selectively reducing NOx as described above. The NOx catalyst produced by ion-exchanging the crystalline zeolite with Fe (which will be hereinafter referred to as "Fe-exchanged NOx catalyst") may tend to have high NOx removing capability at relatively high temperatures (e.g. in the temperature range above 400° C.) as shown by line L1 in FIG. 2. The active component having the property of selectively reducing NOx used in the second catalyst layer 32 of the NOx catalyst 3 is Cu, which is another active component having the property of selectively reducing NOx. The NOx catalyst produced by ion-exchanging crystalline zeolite with Cu (which will be hereinafter referred to as "CU-exchanged NOx catalyst") may tend to have high NOx removing capability at relatively low temperatures (e.g. in the temperature range between 230° C. and 400° C.) as shown by line L2 in FIG. 2. The Cu-exchanged NOx catalyst may have higher oxidation capability than the Fe-exchanged NOx catalyst. Therefore, at high temperatures, the Cu-exchanged NOx catalyst may exhibit high selectivity to the reaction of oxygen and the reducing agent, so that it may tend to oxidize ammonia, which is intended to serve as reducing agent for reducing NOx, to produce NOx, and the NOx removal rate is deteriorated.

As above, the first catalyst layer 31 corresponds to the high-temperature catalyst layer according to the present invention, and the second catalyst layer 32 corresponds to the low-temperature catalyst layer according to the present invention. As the NOx catalyst 3 has the first catalyst layer 31 and the second catalyst layer 32 which are arranged one above the other as shown in FIG. 1B, the NOx catalyst can remove NOx by reducing it through a relatively large range of temperature of the NOx catalyst 3. Specifically, when the temperature of the NOx catalyst 3 is in a low temperature removal range T2 (which corresponds to the specific low temperature range according to the present invention), NOx is expected to be removed mainly utilizing the NOx reduction capability of the second catalyst layer 32. When the temperature of the NOx catalyst 3 is in a high temperature removal range T3 (which corresponds to the specific high temperature range according to the present disclosure), NOx is expected to be removed mainly utilizing the NOx reduction capability of the first catalyst layer 31. Since the first catalyst layer 31 as the high-temperature catalyst layer is arranged above the second catalyst layer 32, when the temperature of the NOx catalyst 3 is in the high temperature removal range T3, ammonia in the exhaust gas is consumed by the first catalyst layer 31, so that ammonia is not apt to reach the second catalyst layer 32. Consequently, ammonia can be prevented from changing into NOx. Thus, a decrease in the NOx removal rate of the NOx catalyst 3 at high temperatures can be effectively prevented.

In the range T1 of the temperature of the NOx catalyst 3 below the low temperature removal range T2, the NOx catalyst 3 is not sufficiently active, and removal of NOx by reduction is not likely. This range T1 will be referred to as the inactive range. In the temperature range T4 above the high temperature removal range T3, the NOx removal rate of the first catalyst layer 31 may deteriorate due to high temperature. Therefore, the temperature range T4 will be referred to as the excessively high temperature range. In the inactive range T1 and the excessively high temperature range T4, removal of NOx by reduction by the NOx catalyst 3 may not be expected, and therefore addition of urea solution through the supply valve 5 may be suspended.

A NOx sensor 10 that measures the NOx concentration in the exhaust gas flowing into the NOx catalyst 3 is provided upstream of the NOx catalyst 3. Another NOx sensor 11 that measures the NOx concentration in the exhaust gas flowing out of the NOx catalyst 3 is provided downstream of the NOx catalyst 3. Moreover, a temperature sensor 14 that measures the temperature of the exhaust gas flowing out of the NOx catalyst 3 is provided downstream of the NOx catalyst 3. The internal combustion engine 1 is equipped with an electronic control unit (ECU) 20, which is a unit that controls the operation state of the internal combustion engine 1 and the exhaust gas purification apparatus. The ECU may be programmed and configured to perform processes and functions of the present disclosure. The ECU 20 is electrically connected with various sensors, such as the NOx sensors 10, 11 and the temperature sensor 14 described above, a crank position sensor 21, an accelerator opening degree sensor 22, and an air flow meter 26 provided in the intake passage 25 of the internal combustion engine 1, and the measurement values of the sensors are entered into the ECU 20. Thus, the ECU 20 can recognize parameters concerning the operation state of the internal combustion engine 1, such as the intake air quantity based on the measurement value of the air flow meter 26, the exhaust gas flow rate calculated based on the intake air quantity, the engine speed based on the measurement value of the crank position sensor 21, and the engine load based on the measurement value of the accelerator opening degree sensor 22.

In this example, the concentration of NOx in the exhaust gas flowing into the NOx catalyst 3 can be measured by the NOx sensor 10. Alternatively, the concentration of NOx in the exhaust gas discharged from the internal combustion engine 1 (that is, the exhaust gas before subjected to purification by the NOx catalyst 3 or the exhaust gas flowing into the NOx catalyst 3) can be estimated based on the operation state of the internal combustion engine 1, because it has correlation with the operation state of the internal combustion engine 1.

The ECU 20 sends a command to the supply valve 5 the taking account of the NOx concentration in the exhaust gas thus measured or estimated, so that a quantity of urea solution needed to remove NOx by reduction is added to the exhaust gas. For example, the quantity of urea solution to be added through the supply valve 5 may be determined in such a way as to keep the actual NOx removal rate with the NOx catalyst 3 determined by the following equation (1) within a predetermined range that is appropriately determined to meet requirements in exhaust gas purification. Alternatively, the quantity of urea solution to be added through the supply valve 5 may be determined based on the estimated amount of ammonia adsorbed in the SCR catalyst.

(NOx removal rate)=1−(measurement value of NOx sensor 11)/(measurement value of NOx sensor 10)    (equation 1)

In the NOx catalyst 3, the second catalyst layer 32 as the low-temperature catalyst layer is arranged as a lower layer, as described above. Therefore, when the temperature of the NOx catalyst 3 is in the low temperature removal range T2, in order to promote the reduction reaction of NOx in the second catalyst layer 32, it is necessary to deliver ammonia as reducing agent to the second catalyst layer 32 through the first catalyst layer 31 arranged above the second catalyst layer 32. As ammonia is adsorbed by the first catalyst layer 31, the quantity of ammonia delivered to the second catalyst layer 32 decreases. Thus, a mode of addition of urea solution takes account of the presence of the first catalyst layer 31 and promotes the reduction reaction of NOx in the second catalyst layer 32.

In view of the above, in an exhaust gas purification apparatus according to the present disclosure, when NOx reduction reaction is supposed to occur in the second catalyst layer 32 of the NOx catalyst 3, namely when the temperature of the NOx catalyst 3 is in the low temperature removal range T2, the mode of addition of urea solution though the supply valve 5 is changed to a mode different from the mode employed when the temperature of the NOx catalyst 3 is in the high temperature removal range T3. In the following, addition of urea solution in the case where the temperature of the NOx catalyst 3 is in the low temperature removal range T2 will be described briefly with reference to FIGS. 3A and 3B. FIG. 3A schematically shows relationship between the supply valve open time of the supply valve 5 (i.e. the duration of the time through which the supply valve 5 is open and urea solution is ejected into the exhaust gas) and the concentration of ammonia in the reducing agent atmosphere (i.e. the reducing agent atmosphere flowing into the NOx catalyst 3) formed in the exhaust gas by the addition of urea solution, in the case of a first mode of urea solution addition that is performed when the temperature of the NOx catalyst 3 is in the low temperature removal range T2. This relationship will be hereinafter referred to as "concentration relationship".

In the addition mode shown in FIG. 3A, urea solution is added once during the reducing agent addition period, and the aforementioned supply valve open time is the duration of time through which the supply valve 5 is open. The reducing agent addition period defined in the context of the present invention is a certain period during which addition of a specific addition quantity of urea solution that is adapted to the quantity of NOx flowing into the NOx catalyst 3 is performed. The reducing agent addition period is a period from the time at which addition of a specific addition quantity of urea solution is performed to the time at which next addition of a specific addition quantity of urea solution is performed. The specific addition quantity is calculated based on the aforementioned equation 1 and the amount of ammonia adsorbed in the NOx catalyst etc. In FIG. 3A, the reducing agent addition period is represented by Δa. The duration of the reducing agent addition period is, for example, 2 seconds. Since the reducing agent addition period Δa is relatively short, in the case where the exhaust gas is continuously flowing into the NOx catalyst 3, as in the case shown in FIG. 3A, the reducing agent addition period Δa is repeated successively, and addition of reducing agent is performed once in every reducing agent addition period Δa. Thus, the supply valve open time of the supply valve 5 is shorter than the reducing agent addition period Δa. FIG. 3B schematically illustrates how ammonia diffuses in the NOx catalyst 3 if the addition of urea solution shown in FIG. 3A is performed. The concentration of ammonia in the reducing agent atmosphere is calculated by dividing the quantity of ammonia produced per unit time by the exhaust gas flow rate per unit time.

In FIG. 3A, L3 and L4 represent concentration relationships in the case where the same specific addition quantity of urea solution is added to the exhaust gas through the supply valve 5 during the reducing agent addition period Δa. Specifically, L3 represents a concentration relationship according to a standard diffusion model, and L4 represents a concentration relationship according to the present invention. In this connection, L0 represents a concentration relationship in the reducing agent addition period next to the reducing agent addition period Δa. The standard diffusion model is a standard model of diffusion of ammonia in the NOx catalyst 3 in which ammonia diffuses from the upper layer side of the NOx catalyst 3 and is gradually adsorbed. In the case of this standard model, as illustrated by a hatched area R1 in FIG. 3B, ammonia diffuses downstream from the upper layer side of the NOx catalyst 3 extensively with the flow of exhaust gas indicated by the hollow arrow. In the case of L3, no particular consideration taking account of the presence of the first catalyst layer 31 is made about the mode of addition of urea solution for the purpose of delivering ammonia to the second catalyst layer 32 when the temperature of the NOx catalyst 3 is in the low temperature removal range T2. Thus, the supply valve open time Δf1 in the case of L3 is determined according to the standard diffusion model that is irrelevant to the temperature of the NOx catalyst 3.

In an apparatus of present disclosure, in order to deliver ammonia to the second catalyst layer 32 when temperature of the NOx catalyst 3 is in the low temperature removal range T2, addition of urea solution taking account of the presence of the first catalyst layer 31 is performed. Specifically, addition of urea solution through the supply valve 5 is performed with an increased ejection pressure of the supply valve 5 so as to add the same quantity of urea solution to the exhaust gas with an supply valve open time Δf2 shorter than the supply valve open time Δf1 in the case where the standard diffusion model is applied. In consequence, as shown by L4 in FIG. 3A, the concentration of ammonia in the reducing agent atmosphere in the exhaust gas flowing into the NOx catalyst 3 is higher than the concentration of ammonia in the case where the standard diffusion model is applied. Thus, in the case of the present invention, when the temperature of the NOx catalyst 3 is in the low temperature removal range T2, the rate of addition of urea solution to the exhaust gas is made higher than in the case where the standard diffusion model is applied to form a reducing agent atmosphere in which ammonia is distributed at high concentration in the exhaust gas. In consequence, as illustrated by a hatched area R2 in FIG. 3B, in the case of the present invention, the ammonia supplied to the NOx catalyst 3 is less apt to diffuse downstream with respect to the exhaust gas flow than in the case where the standard diffusion model is applied (namely, the case illustrated by the hatched area R1) and diffuses in the depth direction (or vertical direction) of the NOx catalyst 3. Consequently, ammonia can be delivered to the second catalyst layer 32 for reduction reaction of NOx in the second catalyst layer 32, in spite of the presence of the first catalyst layer 31. This model of diffusion of ammonia in the NOx catalyst 3 according to the present invention, which enables the delivery of ammonia to the second catalyst layer 32 by forming a high concentration reducing agent atmosphere, will be referred to as the high concentration diffusion model.

Addition of urea solution in the case where the temperature of the NOx catalyst 3 is in the low temperature removal range T2 or high temperature removal range T3 will be described briefly with reference to FIG. 4. In FIG. 4, relationships between the temperature of the NOx catalyst 3 and the supply valve open time of the supply valve 5, the concentration of ammonia in the aforementioned reducing agent atmosphere, and the rate of supply of ammonia (or the supply quantity per unit time) to the NOx catalyst 3 in the case where a specific addition quantity of urea solution is supplied through the supply valve 5 as in FIG. 3A are shown in the upper graph (a), the middle graph (b), and the lower graph (c) respectively. In the graphs (a), (b), and (c) in FIG. 4, line L5 represents the relationships according to the standard diffusion model, and line L6 represents the relationships according to the present invention.

In the case where the standard diffusion model is applied, addition of urea solution is performed without taking account of the temperature of the NOx catalyst 3. Therefore, in the relationships shown in FIG. 4, the supply valve open time, the concentration of ammonia, and the ammonia supply rate are constant irrespective of the temperature of the NOx catalyst 3.

In the case where embodiments of the present disclosure are applied, when the temperature of the NOx catalyst 3 is in the low temperature removal range T2, the supply valve open time is set to a value Δf2 that is shorter than the supply valve open time Δf1 in the case where the standard diffusion model is applied, as described above (see graph (a) in FIG. 4). Consequently, the concentration of ammonia in the reducing agent atmosphere formed in the exhaust gas becomes higher than in the case where the standard diffusion model is applied, as shown in graph (b) in FIG. 4. Consequently, the rate of supply of ammonia to the NOx catalyst 3 becomes higher than in the case where the standard diffusion model is applied, as shown in graph (c) in FIG. 4. In graph (c) in FIG. 4, the chain double-dashed line L7 represents the rate of adsorption of ammonia by the first catalyst layer 31. The ammonia adsorption rate generally tends to increase with decreasing catalyst temperature, though the ammonia adsorption rate may vary depending on the catalyst type. It can be understood that when the temperature is low, since the rate of supply of ammonia to the NOx catalyst 3 exceeds the rate of adsorption of ammonia by the first catalyst 31 thanks to the increased ammonia concentration as shown in graph (c) in FIG. 4, ammonia can be delivered to the second catalyst layer 32 as shown in FIG. 3B.

In the case where embodiments of the present disclosure are applied, when the temperature of the NOx catalyst 3 is in the high temperature removal range T3, the supply valve open time is set to the value Δf1 determined according to the standard diffusion model. This is because if ammonia is supplied to the second catalyst layer 32 when the temperature of the NOx catalyst 3 is in the high temperature removal range T3, ammonia will be oxidized into NOx by the oxidation capability of the second catalyst layer 32 enhanced by high temperatures, leading to a decrease in the NOx removal rate of the NOx catalyst 3. Therefore, when the temperature of the NOx catalyst 3 is in the high temperature removal range T3, the supply valve open time is set to Δf1, thereby preventing the ammonia from being delivered to the second catalyst layer 32 as reliably as possible. Thus, the NOx removal rate of the NOx catalyst 3 can be maintained at a satisfactory level. In consequence, when the temperature of the NOx catalyst 3 is in the high temperature removal range T3, the concentration of ammonia and the rate of supply of ammonia are also the same as those in the case where the standard diffusion model is applied.

Now, the change of the concentration of ammonia with time in the case where addition of urea solution represented by line L6 in FIG. 4 (i.e. addition of urea solution according to embodiments of the present disclosure) is performed will be described in detail with reference to FIG. 5. FIG. 5 shows the change with time of the concentration of ammonia in the reducing agent atmosphere formed in the exhaust gas in the case where addition of reducing agent is performed according to the present invention. More specifically, the upper graph in FIG. 5 shows the change of the ammonia concentration with time in the case where the temperature of the NOx catalyst 3 is in the low temperature removal range T2 (low temperature state), and the lower graph in FIG. 5 shows the change of the ammonia concentration with time in the case where the temperature of the NOx catalyst 3 is in the high temperature removal range T3 (high temperature state). In the low temperature state, since the supply valve open time Δf2 is set shorter than Δf1, the magnitude of change of the ammonia concentration in the reducing agent atmosphere (i.e. the difference between the peak value d1 of the concentration and the lowest value d0 of the concentration) is larger than the magnitude of change of the ammonia concentration in the high temperature state (i.e. the difference between the peak value d3 of the concentration and the lowest value d2 of the concentration). The peak value d1 of the concentration in the low temperature state is higher than the peak value d3 of the concentration in the high temperature state. The reason why the change of the ammonia concentration in the reducing agent atmosphere in the exhaust gas with time differs between the low temperature state and the high temperature state in the case where the same specific addition quantity of urea solution is added is that the supply rate of ammonia is increased by the addition of urea solution according to the present invention, as described above.

As above, in the case where embodiments of the present disclosure are applied, under the condition that the same specific addition quantity of urea solution is added, the supply valve open time in the case where the temperature of the NOx catalyst 3 is in the low temperature removal range T2 is made shorter than the supply valve open time in the case where the temperature of the NOx catalyst 3 is in the high temperature removal range T3, so that the concentration of ammonia in the reducing agent atmosphere supplied to the NOx catalyst 3 is higher in the former case than in the latter case. In consequence, when the temperature of the NOx catalyst 3 is in the low temperature removal range T2, ammonia can be delivered to the second catalyst layer 32 with reliability, and the reduction reaction of NOx by the NOx catalyst 3 at low temperatures can be promoted effectively.

Next, a second mode of urea solution addition performed in the case where the temperature of the NOx catalyst 3 is in the low temperature removal range T2 will be described with reference to FIGS. 6 to 8. FIG. 6 relates to addition of urea solution in spikes according to the second mode of urea solution addition. FIG. 6 schematically shows relationship between spike intervals (i.e. intervals between successive additions) during the reducing agent addition period Δa and the concentration of ammonia in the reducing agent atmosphere formed in the exhaust gas by the addition of urea solution in spikes. In the spike addition mode shown in FIG. 6, addition of reducing agent is performed multiple times in the reducing agent addition period, and the total quantity of reducing agent added by the multiple times of addition amounts to the aforementioned specific addition quantity. In FIG. 6, two successive reducing agent addition periods Δa are shown, where one of them is denoted by Δa(1) and the other is denoted by Δa(2) for distinction. In both the reducing agent addition periods, the supply valve open time is set to the same value Δf3, and therefore the ejection pressure of the supply valve 5 is kept constant.

During each of the reducing agent addition periods Δa(1) and Δa(2), the same specific addition quantity of urea solution in total is added to the exhaust gas through the supply valve 5, and lines D1 and D2 represent the concentration relationships in the respective reducing agent addition periods Δa(1) and Δa(2). Specifically, line D2 represents the concentration relationship according to the standard diffusion model, and line D1 represents the concentration relationship according to the present invention. The concentration represented by D1 is higher than the concentration represented by D2. In the reducing agent addition period Δa(l), the spike intervals Δs1 are equal, and in the reducing agent addition period Δa(2), the spike intervals Δs2 are equal. As with the standard diffusion model in the first mode of urea solution addition, the standard diffusion model in the second mode of urea solution addition is a standard model of diffusion of ammonia in the NOx catalyst 3 in which ammonia diffuses from the upper layer side of the NOx catalyst 3 and is gradually adsorbed. In the case of this standard model, as illustrated by the hatched area R1 in FIG. 3B, ammonia diffuses downstream from the upper layer side of the NOx catalyst 3 extensively with the flow of the exhaust gas indicated by the hollow arrow. In the high concentration diffusion model in the second mode of urea solution addition, as in the high concentration diffusion model in the first mode of urea solution addition, addition of urea solution taking account of the presence of the first catalyst layer 31 is performed in order to deliver ammonia to the second catalyst layer 32. In consequence, as illustrated by the hatched area R2 in FIG. 3B, the ammonia supplied to the NOx catalyst 3 is less apt to diffuse downstream with respect to the exhaust gas flow than in the case where the standard diffusion model is applied (namely, the case illustrated by the hatched area R1) and diffuses in the depth direction of the NOx catalyst 3. Consequently, ammonia can be delivered to the second catalyst layer 32 for reduction of NOx by the second catalyst layer 32, in spite of the presence of the first catalyst layer 31.

Addition of urea solution in the case where the temperature of the NOx catalyst 3 is in the low temperature removal range T2 or high temperature removal range T3 will be described briefly with reference to FIG. 7. In FIG. 7 relationships between the temperature of the NOx catalyst 3 and the spike interval in the reducing agent addition period, the concentration of ammonia in the aforementioned reducing agent atmosphere, and the rate of supply of ammonia (or the supply quantity per unit time) to the NOx catalyst 3 in the case where a specific addition quantity of urea solution is added through the supply valve 5 as in FIG. 4 are shown in the upper graph (a), the middle graph (b), and the lower graph (c) respectively. In the graphs (a), (b), and (c) in FIG. 7, line L15 represents the relationships according to the standard diffusion model, and line L16 represents the relationships according to the present invention.

In the case where the standard diffusion model is applied, in the relationships shown in FIG. 7, the spike interval, the concentration of ammonia, and the ammonia supply rate are constant irrespective of the temperature of the NOx catalyst 3. In the case where embodiments of the present disclosure are applied, when the temperature of the NOx catalyst 3 is in the low temperature removal range T2, the spike interval is set to a value Δs1 that is shorter than the spike interval Δs2 in the case where the standard diffusion model is applied, as described above (see graph (a) in FIG. 7). Consequently, the concentration of ammonia in the reducing agent atmosphere formed in the exhaust gas becomes higher than that in the case where the standard diffusion model is applied, as shown in graph (b) in FIG. 7. Consequently, the rate of supply of ammonia to the NOx catalyst 3 becomes higher than that in the case where the standard diffusion model is applied, as shown in graph (c) in FIG. 7. In graph (c) in FIG. 7, the chain double-dashed line L17 represents the rate of adsorption of ammonia by the first catalyst layer 31. It can be understood that when the temperature is low, since the rate of supply of ammonia to the NOx catalyst 3 exceeds the rate of adsorption of ammonia by the first catalyst 31 thanks to the increased ammonia concentration as shown in graph (c) in FIG. 7, ammonia can be delivered to the second catalyst layer 32 as shown in FIG. 3B.

In the case where embodiments of the present disclosure are applied, when the temperature of the NOx catalyst 3 is in the high temperature removal range T3, the spike interval is set to the value Δs2 determined according to the standard diffusion model. This is because if ammonia is supplied to the second catalyst layer 32 when the temperature of the NOx catalyst 3 is in the high temperature removal range T3, ammonia will be oxidized into NOx by the oxidation capability of the second catalyst layer 32 enhanced by high temperatures, leading to a decrease in the NOx removal rate of the NOx catalyst 3. Therefore, when the temperature of the NOx catalyst 3 is in the high temperature removal range T3, the spike interval is set to Δs2, thereby preventing the ammonia from being delivered to the second catalyst layer 32 as reliably as possible. Thus, the NOx removal rate of the NOx catalyst 3 can be maintained at a satisfactory level. In consequence, when the temperature of the NOx catalyst 3 is in the high temperature removal range T3, the concentration of ammonia and the rate of supply of ammonia are also the same as those in the case where the standard diffusion model is applied.

Now, the change of the concentration of ammonia with time in the case where addition of urea solution represented by line L16 in FIG. 7 (i.e. addition of urea solution according to embodiments of the present disclosure) is performed will be described in detail with reference to FIG. 8. FIG. 8 shows the change with time of the concentration of ammonia in the reducing agent atmosphere formed in the exhaust gas in the case where addition of urea solution is performed according to the present invention. More specifically, the upper graph in FIG. 8 shows the change of the ammonia concentration with time in the case where the temperature of the NOx catalyst 3 is in the low temperature removal range T2 (low temperature state), and the lower graph in FIG. 8 shows the change of the ammonia concentration with time in the case where the temperature of the NOx catalyst 3 is in the high temperature removal range T3 (high temperature state). In the low temperature state, since the spike interval Δs1 is set shorter than Δs2, the magnitude of change of the ammonia concentration in the reducing agent atmosphere (i.e. the difference between the peak value d11 of the concentration and the lowest value d10 of the concentration) is larger than the magnitude of change of the ammonia concentration in the high temperature state (i.e. the difference between the peak value d13 of the concentration and the lowest value d12 of the concentration). The peak value d11 of the concentration in the low temperature state is higher than the peak value d13 of the concentration in the high temperature state. The reason why the change of the ammonia concentration in the reducing agent atmosphere in the exhaust gas with time differs between the low temperature state and the high temperature state in the case where the same specific addition quantity of urea solution is added is that the supply rate of ammonia is increased by the addition of urea solution according to embodiments of the present disclosure, as described above.

As above, in the case where embodiments of the present disclosure are applied, provided that the same specific addition quantity of urea solution is added, the spike interval in the case where the temperature of the NOx catalyst 3 is in the low temperature removal range T2 is made shorter than the spike interval in the case where the temperature of the NOx catalyst 3 is in the high temperature removal range T3, so that the concentration of ammonia in the reducing agent atmosphere supplied to the NOx catalyst 3 is higher in the former case than in the latter case. In consequence, when the temperature of the NOx catalyst 3 is in the low temperature removal range T2, ammonia can be delivered to the second catalyst layer 32 with reliability, and the reduction reaction of NOx by the NOx catalyst 3 at low temperatures can be promoted effectively.

With the above in mind, control for removing NOx performed in the exhaust gas purification apparatus of the internal combustion engine 1 shown in FIG. 1A will be described in the following with reference to FIG. 9. This NOx removal control is executed repeatedly by a control program stored in the ECU 20 to control addition of urea solution to the exhaust gas performed during the reducing agent addition period for removing NOx. Firstly in step S101, the catalyst temperature Tc of the NOx catalyst 3 is determined. Specifically, the catalyst temperature Tc of the NOx catalyst 3 is estimated using the measurement value of the temperature sensor 14. The catalyst temperature Tc can serve as a parameter used to determine to which catalyst layer the NOx reduction reaction occurring in the NOx catalyst 3 is mainly attributed as shown in FIG. 2. After the completion of step S101, the process proceeds to step S102.

In step S102, an addition quantity of urea solution to be added through the supply valve 5 by this control is calculated. The urea solution addition quantity calculated here corresponds to the aforementioned specific addition quantity. The urea solution addition quantity is determined in accordance with the quantity of NOx contained in the exhaust gas flowing into the NOx catalyst 3 in a specific period (e.g. 2 seconds) or determined in such a way that the NOx removal rate of the NOx catalyst 3 determined by the aforementioned equation 1 in the same specific period falls within a predetermined range. Thereafter, in step S103, it is determined whether or not the NOx catalyst 3 is active. Specifically, if the catalyst temperature Tc of the NOx catalyst 3 is in the inactive range T1, step S103 is answered in the negative, and otherwise, step S103 is answered in the affirmative. If an affirmative determination is made in step S103, the process proceeds to step S1.04, and if a negative determination is made, this control process is terminated.

In step S104, it is determined whether or not the catalyst temperature Tc of the NOx catalyst 3 is in the low temperature removal range T2. If an affirmative determination is made in step S104, the process proceeds to step S106, and if a negative determination is made, the process proceeds to step S105. In step S105, it is determined whether or not the catalyst temperature Tc of the NOx catalyst 3 is in the high temperature removal range T3. If an affirmative determination is made in step S105, the process proceeds to step S108, and if a negative determination is made, the process proceeds to step S110. As will be seen, the decision process in steps S104 and S105 is the process of determining in which range among the low temperature removal range T2, the high temperature removal range T3, and the excessively high temperature range T4 the catalyst temperature Tc of the NOx catalyst 3 falls.

The processing from step S106 onward, which is performed if it is determined that the catalyst temperature Tc of the NOx catalyst 3 is in the low temperature removal range T2, will be described. When the catalyst temperature Tc of the NOx catalyst 3 is in the low temperature removal range T2, it is necessary to deliver ammonia derived from the added urea solution to the second catalyst layer 32 to facilitate reduction of NOx in the second catalyst layer 32. To this end, in step S106, in order to deliver ammonia to the second catalyst layer 32, addition of urea solution through the supply valve 5 is performed according to the high concentration diffusion model. Specifically, an supply valve open time Δf2 that can establish a predetermined ammonia concentration that enables delivery of ammonia to the second catalyst layer 32 is determined based on factors such as the exhaust gas flow rate relating to the formation of ammonia atmosphere in the exhaust gas, and an ejection pressure of the supply valve 5 with which the specific quantity of urea solution determined in step S102 can be injected in the supply valve open time thus determined is calculated. In connection with the above, the supply valve open time is determined taking into account the relationship that the shorter the supply valve open time is, the higher the ammonia concentration becomes, and the higher the exhaust gas flow rate is, the lower the ammonia concentration becomes (see FIG. 17B discussed later). The aforementioned predetermined ammonia concentration may be either a constant value that is fixed irrespective of the catalyst temperature in the low temperature removal range T2 or a value varied with the catalyst temperature. After the completion of step S106, the process proceeds to step S107.

In step S107, a high concentration addition process is executed. In this process addition of urea solution through the supply valve 5 with the supply valve open time $\Delta f2$ determined in step S106 is performed. Thus, addition of urea solution represented by L4 in FIG. 3A is performed, so that diffusion of ammonia in the NOx catalyst 3 illustrated by the hatched area R2 in FIG. 3B is brought about. In consequence, when the temperature of the NOx catalyst 3 is in the low temperature removal range T2, ammonia can be delivered to the second catalyst layer 32 with reliability. Thus, the NOx removal rate of the NOx catalyst 3 can be maintained at a satisfactory level.

Next, the processing of steps S108 and S109, which is performed if it is determined that the catalyst temperature Tc of the NOx catalyst 3 is in the high temperature removal range T3, will be described. In this case, it is possible to achieve satisfactory supply of ammonia in the NOx catalyst 3 by causing ammonia to diffuse in the NOx catalyst 3 according to the standard diffusion model even without performing the above-described high concentration addition process. When the temperature of the NOx catalyst 3 is in the high temperature removal range T3 (when an affirmative determination is made in step S105), if ammonia is delivered to the second catalyst layer 32, there is a risk of deterioration in the NOx removal rate by oxidation of ammonia. For this reason, if an affirmative determination is made in step S105, it is preferred that a standard concentration addition process (S109) assuming the diffusion of ammonia according to the standard diffusion model be performed. In step S108, an supply valve open time $\Delta f1$ for this process is determined. The supply valve open time is determined according to the standard diffusion model.

If a negative determination is made in step S105, addition of urea solution through the supply valve 5 is disabled (processing of step S110). This is because there is a risk that ammonia produced from added urea solution may changes into NOx, as the temperature of the NOx catalyst 3 is in the excessively high temperature range T4.

As above, by this NOx removal control, ammonia can be supplied to the first catalyst layer 31 and the second catalyst layer 32 in an appropriate manner suitable for the temperature of the NOx catalyst 3. In consequence, efficient reduction of NOx by the NOx catalyst 3 can be carried out in both the low temperature state and the high temperature state. In particular, the efficiency of reduction of NOx by the NOx catalyst 3 in the low temperature state can be improved favorably.

In the above-described NOx removal control, the duration of the supply valve open time is controlled to carry out the high concentration addition process. Alternatively, in the case of the mode in which addition of urea solution is performed in spikes, as has been described with reference to FIGS. 6 to 8, the high concentration addition process may be carried out by controlling the spike interval. Specifically, instead of the above-described processing of step S106, a spike interval $\Delta s1$ that can establish a predetermined ammonia concentration that enables delivery of ammonia to the second catalyst layer 32 is determined based on factors such as the exhaust gas flow rate relating to the formation of ammonia atmosphere in the exhaust gas. The spike interval is determined taking into account the relationship that the shorter the spike interval is, the higher the ammonia concentration becomes, and the higher the exhaust gas flow rate is, the lower the ammonia concentration becomes (see FIG. 17C discussed later). The aforementioned predetermined ammonia concentration may be either a constant value that is fixed irrespective of the catalyst temperature in the low temperature removal range T2 or a value varied with the catalyst temperature.

First Modification

A first modification of the high concentration addition process will be described with reference to FIG. 10. This modification relates to the concentration of ammonia in the reducing agent atmosphere resulting from addition of urea solution through the supply valve 5 performed when the temperature of the NOx catalyst 3 is in the low temperature removal range T2. As with FIG. 4 described above, FIG. 10 shows relationship between the temperature of the NOx catalyst 3 and the concentration of ammonia in the case where the NOx removal control according to embodiments of the present disclosure is performed. Graph (a) in FIG. 10 is the same as graph (b) in FIG. 4. This mode may be replaced by modes shown in graphs (b), (c), and (d) in FIG. 10, in which the supply valve open time or the spike interval is determined in such a way that the concentration of ammonia becomes higher when the temperature of the NOx catalyst 3 is in the low temperature removal range T2 than when the temperature of the NOx catalyst 3 is in the high temperature removal range T3 and that the concentration of ammonia increases with decreasing temperature of the NOx catalyst 3 in the low temperature removal range T2.

Specifically, when the temperature of the NOx catalyst 3 is in the low temperature removal range T2, in the mode shown in graph (b) in FIG. 10, the supply valve open time or the spike interval is determined in such a way that the concentration of ammonia increases linearly with decreasing temperature of the NOx catalyst 3. In the mode shown in graph (c) in FIG. 10, the supply valve open time or the spike interval is determined in such a way that the concentration of ammonia increases quadratically with decreasing temperature of the NOx catalyst 3. In the mode shown in graph (d) in FIG. 10, the supply valve open time or the spike interval is determined in such a way that the concentration of ammonia increases logarithmically with decreasing temperature of the NOx catalyst 3. Which of the above-described modes of determining the supply valve open time or the spike interval to adopt may be determined taking account of conditions such as the state of diffusion and adsorption of ammonia in the NOx catalyst 3. In the embodiments of the present disclosure, any illustrated or not-illustrated mode may be adopted so long as it enables ammonia to be delivered to the second catalyst layer 32 satisfactorily when the temperature of the NOx catalyst 3 is in the low temperature removal range T2.

Second Modification

A second modification of the high concentration addition process will be described with reference to FIG. 11. The upper graph (a) in FIG. 11 shows addition of urea solution by the standard concentration addition process. Specifically, graph (a) in FIG. 11 schematically shows a mode of addition of urea solution, in which addition of urea solution Pa, Pb, Pc, Pd is performed once in each of four successive reducing agent addition periods Δa. For the sake of simplicity of description, it is assumed that the supply valve open time Δf is the same in all the urea solution additions Pa to Pd, and the specific addition quantity is the same in all the reducing agent addition periods.

The lower graph (b) in FIG. 11 shows a mode of addition of urea solution in the high concentration addition process according to the second modification. Specifically, while addition of a specific addition quantity of urea solution is performed once in every reducing agent addition period Δa in the above-described mode, in the mode according to the second modification, addition of urea solution is not performed in one reducing agent addition period, but urea solution is added in the next reducing agent addition period by a quantity equal to the sum total quantity of reducing agent to be added through two reducing agent addition periods. In other words, the reducing agent addition period is twice as long as that in the standard concentration addition process, and the quantity of urea solution added once in that period is equal to the quantity of urea solution added in two reducing agent addition period in the standard concentration addition process. Thus, in time average, the same quantity of urea solution is added to the exhaust gas in both the standard concentration addition process and the high concentration addition process. In the high concentration addition process, at the time when urea solution is added, the quantity of urea solution added locally to the exhaust gas can be made twice as large as that in the standard concentration addition process. Therefore, high concentration ammonia atmosphere can be formed efficiently.

In this modification, although high ammonia concentration can be established efficiently, the interval between additions of urea solution is relatively long, making it difficult to maintain satisfactory removal of NOx in the NOx catalyst, for example when the quantity of NOx flowing into the NOx catalyst 3 is relatively large, as is the case when the flow rate of the exhaust gas is high. Therefore, it is preferred that when the flow rate of the exhaust gas is relatively low, the high concentration addition process according to this modification be performed, and when the flow rate of the exhaust gas is relatively high, the high concentration addition process by the first mode of urea solution addition that has been described with reference to FIGS. 3A to 5 or the high concentration addition process by the second mode of urea solution addition that has been described with reference to FIGS. 6 to 8 be performed. In particular, in the case where the second mode of urea solution addition is employed, since addition of urea solution is performed multiple times during one reducing agent addition period, ammonia is likely to be delivered to the NOx catalyst 3 ceaselessly, which is beneficial especially when the flow rate of the exhaust gas is relatively high.

Third Modification

As a third modification of the high concentration addition process, a mode of addition of urea solution through the supply valve 5 performed when the temperature of the NOx catalyst 3 is in the low temperature removal range T2 will be described with reference to FIGS. 12 to 15. FIGS. 12 to 15 illustrate how addition of urea solution is controlled in order to control the concentration of ammonia in the reducing agent atmosphere when adding a specific addition quantity of urea solution through the supply valve 5 in the high concentration addition process. The addition of urea solution shown in FIGS. 12 to 15 is performed in the spike mode like that shown in FIG. 6. A specific addition quantity of urea solution in total is added in a plurality of addition spikes during the reducing agent addition period Δa. For example, in the addition pattern shown in the bottom row in FIG. 12, a specific addition quantity of urea solution in total is added by eight times of addition P1 to P8, and in the addition pattern shown in the top row in FIG. 12, a specific addition quantity of urea solution in total is added by four times of addition P31 to P34.

Firstly, addition of urea solution shown in FIG. 12 will be described. FIG. 12 shows four patterns of addition of urea solution in spikes. In all the patterns, the total quantity of urea solution added through the supply valve 5 to the exhaust gas through the reducing agent addition period Δa is the same. In the bottom pattern in FIG. 12, urea solution is added to the exhaust gas through the supply valve 5 in eight spikes, and the total quantity of urea solution thus added amounts to the specific addition quantity. In the second to bottom pattern, a quantity of urea solution added by the fourth spike P4 in the bottom pattern is equally distributed to the first to third spikes P1 to P3. Thus, there are spikes P11, P12, and P13 in the second to bottom pattern. Similarly, a quantity of urea solution added by the eighth spike P8 in the bottom pattern is equally distributed to the fifth to seventh spikes P5 to P7. Thus, there are spikes P14, P15, and P16 in the second to bottom pattern. The timing of the spikes is the same as that in the bottom pattern. In this second to bottom pattern, while the quantity of urea solution added through the reducing agent addition period Δa is the same specific addition quantity, the concentration of ammonia in the reducing agent atmosphere formed in the exhaust gas can be made higher than that in the bottom pattern.

In the third to bottom pattern, the quantity of urea solution added in each spike is the same as that in the second to bottom pattern, but the intervals between the first to third spikes are shortened, and the intervals between the fourth to sixth spikes are also shortened. The timing of the first spike 21 and the fourth spike P24 is the same as that in the second to bottom pattern. In this third to bottom pattern, while the quantity of urea solution added through the reducing agent addition period Δa is the same specific addition quantity, the concentration of ammonia in the reducing agent atmosphere formed in the exhaust gas can be made further higher than that in the second to bottom pattern.

In the top pattern, while the timing of spikes are the same as that in the third to bottom pattern, a quantity of urea solution added by the third spike P23 in the third to bottom pattern is equally distributed to the first and second spikes P21 and P22. Thus, there are spikes P31 and P33 in the top pattern. Similarly, a quantity of urea solution added by the sixth spike P26 in the third to bottom pattern is equally distributed to the fourth and fifth spikes P24 and P25. Thus, there are spikes P33 and P34 in the top pattern. In the top pattern, while the quantity of urea solution added through the reducing agent addition period Δa is the same specific addition quantity, the concentration of ammonia in the reducing agent atmosphere formed in the exhaust gas can be made further higher than that in the third to bottom pattern.

As above, even in cases where the same specific addition quantity of urea solution is added through the supply valve 5 through the reducing agent addition period Δa, the concentration of ammonia in the reducing agent atmosphere formed in the exhaust gas can be controlled appropriately by controlling the quantity of urea solution added by each spike and the spike intervals. Therefore, in the high concentration addition process, which is performed in order to deliver ammonia to the second catalyst layer 32 when the temperature of the NOx catalyst 3 is in the low temperature removal range T2, a reducing agent atmosphere having a desired ammonia concentration can be formed by controlling the quantity of urea solution added by each spike and the spike intervals.

Addition of urea solution shown in FIG. 13 will be described. FIG. 13 shows four patterns of addition of urea solution in spikes. In the case shown in FIG. 13, the second to bottom pattern is created by distributing a quantity of urea solution added by the fourth spike P4 in the bottom pattern to spikes P1 to P3 and distributing a quantity of urea solution added by the eighth spike P8 in the bottom pattern to spikes P5 to P7. In this case, the urea solution is distributed not equally but in such a way that the quantities of urea solution added by the spikes decrease in the order of spikes P11, P12, and P13 and in the order of spikes P14, P15, and P16. Similarly, the top pattern in FIG. 13 is created by distributing the urea solution in such a way that the quantities of urea solution added by the spikes decrease in the order of spikes P31 and P32 and in the order of spikes P33 and P34. Besides the above, the patterns shown in FIG. 13 are created in the same manner as those in FIG. 12 and will not be described in further detail. As shown in FIG. 13, even in cases where the same specific addition quantity of urea solution is added through the supply valve 5 through the reducing agent addition period Δa, the concentration of ammonia in the reducing agent atmosphere formed in the exhaust gas can be controlled appropriately by controlling the quantity of urea solution added by each spike and the spike intervals. Therefore, this mode can be applied suitably to the above-described high concentration addition process.

Next, addition of urea solution shown in FIG. 14 will be described. FIG. 14 also show four patterns of addition of urea solution in spikes. The quantities of urea solution added by the respective spikes in the patterns shown in FIG. 14 are the same as the quantities of urea solution added by the respective spikes in the patterns shown in FIG. 12, but the timing of the spikes are different from those in the patterns shown in FIG. 12. Specifically, the timing of the spikes in the patterns shown in FIG. 14 is arranged in such a way that all the spike intervals in each pattern are equal. Thus, in the second to bottom pattern and in the top pattern, equally distributed spikes are arranged at regular intervals. In the third to bottom pattern, the spikes are arranged at reduced regular intervals. As shown in FIG. 14, even in cases where the same specific addition quantity of urea solution is added through the supply valve 5 through the reducing agent addition period Δa, the concentration of ammonia in the reducing agent atmosphere formed in the exhaust gas can be controlled appropriately by controlling the quantity of urea solution added by each spike and the spike intervals. Therefore, this mode can be applied suitably to the above-described high concentration addition process.

Next, addition of urea solution shown in FIG. 15 will be described. FIG. 15 also show four patterns of addition of urea solution in spikes. The quantities of urea solution added by the respective spikes in the patterns shown in FIG. 15 are the same as the quantities of urea solution added by the respective spikes in the patterns shown in FIG. 13, but the timing of the spikes are different from those in the patterns shown in FIG. 13. Specifically, the timing of the spikes in the patterns shown in FIG. 15 is arranged in such a way that all the spike intervals in each pattern are equal. Thus, in the second to bottom pattern and in the top pattern, unevenly distributed spikes are arranged at regular intervals. In the third to bottom pattern, the spikes are arranged at reduced regular intervals. As shown in FIG. 15, even in cases where the same specific addition quantity of urea solution is added through the supply valve 5 through the reducing agent addition period Δa, the concentration of ammonia in the reducing agent atmosphere formed in the exhaust gas can be controlled appropriately by controlling the quantity of urea solution added by each spike and the spike intervals. Therefore, this mode can be applied suitably to the above-described high concentration addition process.

A second example of the NOx removal control performed in the exhaust gas purification apparatus of the internal combustion engine 1 will be described with reference to FIG. 16. The NOx removal control shown in FIG. 16 is executed repeatedly by a control program stored in the ECU 20. The processing executed in the NOx removal control shown in FIG. 16 same as that in the NOx removal control shown in FIG. 9 is denoted by the same reference numeral and will not be described in further detail.

In this NOx removal control, if an affirmative determination is made in step S104, namely if it is determined that the catalyst temperature Tc of the NOx catalyst 3 is in the low temperature removal range T2, the processing of steps S201 and S202 is executed instead of S106. Specifically, in step S201, it is determined whether or not ammonia produced from urea solution added to the exhaust gas through the supply valve 5 can be delivered to the second catalyst layer 32, which is the lower layer of the NOx catalyst 3. Even when the temperature of the NOx catalyst 3 is in the low temperature removal range T2, if the quantity of urea solution added through the supply valve 5 for the purpose of removal of NOx is relatively large, a reducing agent atmosphere having a relatively high concentration is formed even in the case where addition of urea solution is performed according to the above-described standard diffusion model, and ammonia can be delivered to the second catalyst layer 32 in some circumstances.

Therefore, in step S201, it is determined whether or not it is necessary to form a reducing agent atmosphere having a relatively high concentration according to the high concentration diffusion model when the temperature of the NOx catalyst 3 is in the low temperature removal range T2. Specifically, the determination in step S201 is made based on a control map shown in FIG. 17A. In the control map shown in FIG. 17A, whether ammonia will reach the lower second catalyst layer 32 or not is mapped based on the relationship between the temperature of the NOx catalyst 3 and the concentration of ammonia. This control map is stored in a memory in the ECU 20. The control map is prepared taking account of the fact that the lower the temperature of the NOx catalyst 3 is, the higher the ammonia adsorption capability of the upper first catalyst layer 31 is, and the less ammonia is likely to reach the second catalyst layer 32, and consequently, in order to deliver ammonia to the second catalyst layer 32, the higher the ammonia adsorption capability of the first catalyst layer 31 is, the higher the concentration of ammonia in the reducing agent atmosphere flowing into the NOx catalyst 3 needs to be made. Therefore, in the control map shown in FIG. 17A, a region in which ammonia does not reach the lower second layer 32 extends in the lower region, and a region in which ammonia reaches the lower second layer 32 extends in the upper region.

The determination in step S201 is made, for example, based on in which region among the regions in the control map a control point (represented by a filled circle in FIG. 17A) is located. This control point is specified by the catalyst temperature Tc of the NOx catalyst 3 determined in step S101 and the concentration of ammonia in the reducing agent atmosphere formed in the exhaust gas, which is calculated from the addition quantity of urea solution calculated in step S102 and the flow rate of the exhaust gas flowing in the exhaust passage 2 etc. The calculation of concentration of ammonia takes into account the supply valve open time and the spike interval that are determined on the assumption that ammonia diffuses in the NOx catalyst 3 in accordance with the standard diffusion model (see the supply valve open time Δf1 shown in FIG. 3A and the spike interval Δs2 shown in FIG. 6). If an affirmative determination is made in step S201, the process proceeds to step S108, and if a negative determination is made, the process proceeds to step S202. In the illustrative case shown in FIG. 17A, since the control point is located in the region in which ammonia does not reach the lower second catalyst layer 32, a negative determination is made in the decision step of S201.

Then in step S202, how much the concentration of ammonia in the reducing agent atmosphere is to be increased according to the high concentration diffusion model in order to deliver ammonia to the lower second catalyst layer 32. Specifically, the amount of increase of the concentration is calculated based on the control map shown in FIG. 17A. For example, in a case where the aforementioned control point is located at the position of the filled circle in FIG. 17A, in order to shift the control point to the region in which ammonia reaches the lower second catalyst layer 32 (e.g. the position indicated by a hollow circle in FIG. 17A), it is necessary to increase the concentration of ammonia to X1 by an amount ΔX represented by a hollow arrow in FIG. 17A. This amount of increase in the concentration of ammonia is the amount of increase in the concentration calculated in step S202.

In step S202, moreover, the supply valve open time for adding urea solution through the supply valve 5 to achieve the aforementioned increase in the ammonia concentration is determined. Specifically, the supply valve open time is determined using a control map shown in the upper graph (a) in FIG. 17B. The control map shown in graph (a) in FIG. 17B defines relationship between the supply valve open time through which a specific addition quantity of urea solution is added and the concentration of ammonia. This control map is stored in the memory in the ECU 20. The filled circle in graph (a) in FIG. 17B corresponds to the filled circle representing a control point in FIG. 17A. The control map shown in graph (a) in FIG. 17B represents the tendency that the shorter the supply valve open time is, the higher the concentration of ammonia in the resultant reducing agent atmosphere is. Thus, the supply valve open time Δf2 corresponding to the ammonia concentration X1 after the increase ΔX calculated above that enables ammonia to reach the second catalyst layer 32 is determined using the control map. The lower graph (b) in FIG. 17B shows a control map representing relationship between the supply valve open time and the ejection pressure that enables addition of the predetermined addition quantity in the supply valve open time. This control map represents the tendency that the ejection pressure increases with decreasing supply valve open time. The ejection pressure P1 corresponding to the supply valve open time Δf2 determined above is determined using the control map shown in graph (b) in FIG. 17B. After the completion of the processing of step S202, the process proceeds to step S107. In step S107, the high concentration addition process is performed. In this high concentration addition process, urea solution is added through the supply valve 5 according to the supply valve open time Δf2 and the ejection pressure P1 determined in step S202. Thus, ammonia can be delivered to the second catalyst 32 with reliability when the temperature of the NOx catalyst 3 is in the low temperature removal range T2.

As in the NOx removal control shown in FIG. 9, in the high concentration addition process, the spike interval in adding urea solution in spikes may be controlled using a control map shown in FIG. 17C. The filled circle in FIG. 17C corresponds to the filled circle representing a control point in FIG. 17A. This control map represents the tendency that the concentration of ammonia increases with decreasing spike interval. In this case, the spike interval Δs1 corresponding to the ammonia concentration X1 after the increase ΔX calculated in the processing of step S202 is determined using the control map.

Another constitution of the NOx catalyst 3 that can be used in the exhaust gas purification apparatus of the internal combustion engine 1 according to embodiments of the present disclosure will be described with reference to FIG. 18. As with the NOx catalyst 3 used in the above-described embodiments, the NOx catalyst 3 shown in FIG. 18 has an uppermost first catalyst layer 31. Moreover, the NOx catalyst 3 shown in FIG. 18 has an oxidation catalyst layer 35 arranged below the first catalyst layer 31 and a second catalyst layer 32 arranged below the oxidation catalyst layer 35 and on a catalyst substrate 33. With the NOx catalyst 3 having the above-described constitution, when the temperature of the NOx catalyst 3 is in the high temperature removal range T3, NO (nitrogen monoxide) contained in the exhaust gas is oxidized into $NO_2$ by the oxidation capability of the oxidation catalyst layer 35, whereby reduction reaction of NOx in the first catalyst layer 31 can be promoted.

When the temperature of the NOx catalyst 3 is in the low temperature removal range T2, in order to deliver ammonia to the second catalyst layer 32, it may be necessary to cause ammonia to pass through the oxidation catalyst layer 35 as well as the first catalyst layer 31. In this case also, reduction reaction of NOx by the second catalyst layer 32 can be promoted by performing the above-described NOx removal control, namely by performing the high concentration addition process for delivering ammonia to the lower layer. In the case of the NOx catalyst 3 having the constitution shown in FIG. 18, since ammonia delivered to the second catalyst layer 32 passes through the oxidation catalyst layer 35, a portion of ammonia to be delivered may be oxidized into NOx. However, if NOx thus produced is delivered to the second catalyst layer 32, it can be reduced by the NOx reduction capability of the second catalyst layer 32 and removed.

While in the examples described in the foregoing, CU-exchanged NOx catalyst is used as catalyst particles contained in the second catalyst layer 32, the Cu-exchanged catalyst may be replaced by SnMnCeOx, which is a manganese oxide. Since SnMnCeOx is a material that can be produced by known precipitation methods, it will not be described here in detail.

REFERENCE SIGNS LIST

1: internal combustion engine
2: exhaust passage

3: NOx catalyst
5: supply valve
20: ECU
31: first catalyst layer
32: second catalyst layer
33: catalyst substrate

What is claimed is:

1. An exhaust gas purification apparatus for an internal combustion engine, comprising:
a selective catalytic reduction NOx catalyst having a catalyst substrate and a plurality of catalyst layers made up of catalyst particles,
the catalyst particles being configured to selectively reduce NOx with a reducing agent derived from ammonia arranged on the catalyst substrate,
the catalyst layers including
at least a high-temperature catalyst layer configured to reduce NOx at first temperatures and
a low-temperature catalyst layer configured to reduce NOx at second temperatures,
wherein the low-temperature catalyst layer is arranged closer than the high-temperature catalyst layer to the catalyst substrate, and the second temperatures are lower than the first temperatures;
a supply valve configured to add an addition quantity of reducing agent to reduce NOx of exhaust gas flowing into the selective catalytic reduction NOx catalyst; and
a controller comprising at least one processor configured to control addition of the reducing agent by the supply valve,
wherein the concentration of the reducing agent in a reducing agent atmosphere formed in the exhaust gas flowing into the selective catalytic reduction NOx catalyst increases when the temperature of the selective catalytic reduction NOx catalyst is in a low temperature range where the NOx reducing capability of the low-temperature catalyst layer is higher than the NOx reducing capability of the high-temperature catalyst layer;
wherein the increase in the low temperature range is higher than when the temperature of said selective catalytic reduction NOx catalyst is in a high temperature range that is higher than the low temperature range where the NOx reducing capability of the high-temperature catalyst layer is higher than the NOx reducing capability of said low-temperature catalyst layer; and
wherein the increase in the low temperature range occurs during a reducing agent addition period from a time when the addition quantity of reducing agent is added by the supply valve to a next time when the specific addition quantity of reducing agent is added by said supply valve, and provided that the specific addition quantity is the same.

2. An exhaust gas purification apparatus for an internal combustion engine according to claim 1, wherein
as the addition quantity of reducing agent is added to the exhaust gas by the supply valve, the reducing agent concentration in the reducing agent atmosphere changes with time, and the controller controls addition of the reducing agent by said supply valve such that a difference between the highest value and the lowest value of the reducing agent concentration in the reducing agent atmosphere during the reducing agent addition period when the temperature of said selective catalytic reduction NOx catalyst is in the low temperature range is larger than a difference between a highest value and a lowest value of the reducing agent concentration in the reducing agent atmosphere when the temperature of the selective catalytic reduction NOx catalyst is in the high temperature range.

3. An exhaust gas purification apparatus for an internal combustion engine according to claim 1, wherein
as the addition quantity of reducing agent is added to the exhaust gas by the supply valve, the reducing agent concentration in the reducing agent atmosphere changes with time, and the controller controls addition of the reducing agent by the supply valve such that a peak value of the reducing agent concentration in the reducing agent atmosphere during the reducing agent addition period when the temperature of said selective catalytic reduction NOx catalyst is in the low temperature range is higher than a peak value of the reducing agent concentration in the reducing agent atmosphere when the temperature of said selective catalytic reduction NOx catalyst is in the high temperature range.

4. An exhaust gas purification apparatus for an internal combustion engine according to claim 1, wherein
the addition quantity of reducing agent is added to the exhaust gas such that addition of the reducing agent and suspension of the addition are alternated during the reducing agent addition period, and the controller makes an interval between successive additions of the reducing agent shorter to increase the reducing agent concentration in the exhaust gas flowing into the selective catalytic reduction NOx catalyst when the temperature of the selective catalytic reduction NOx catalyst is in the low temperature range, the increase of the reducing agent concentration being higher than when the temperature of said selective catalytic reduction NOx catalyst is in the high temperature range.

5. An exhaust gas purification apparatus for an internal combustion engine according to claim 1, wherein
when the addition quantity of reducing agent is added to the exhaust gas by the supply valve, the controller makes the ejection pressure in ejecting the reducing agent by the supply valve higher to increase the reducing agent concentration in the exhaust gas flowing into the selective catalytic reduction NOx catalyst when the temperature of the selective catalytic reduction NOx catalyst is in the low temperature range compared to when the temperature of the selective catalytic reduction NOx catalyst is in the high temperature range.

6. An exhaust gas purification apparatus for an internal combustion engine according to claim 1, wherein
the controller determines whether the reducing agent will reach the low-temperature catalyst layer when the temperature of the selective catalytic reduction NOx catalyst is in the low temperature range; and
calculates, when it is determined that the reducing agent will not reach the low-temperature catalyst layer, an amount by which the reducing agent concentration in the exhaust gas flowing into the selective catalytic reduction NOx catalyst should be increased to cause the reducing agent to reach the low-temperature catalyst layer,
wherein the controller controls addition of the reducing agent by the supply valve in accordance with the amount of increase of the reducing agent concentration.

* * * * *